US011334095B2

(12) United States Patent
Gu et al.

(10) Patent No.: US 11,334,095 B2
(45) Date of Patent: May 17, 2022

(54) FLIGHT PATH DETERMINATION METHOD, INFORMATION PROCESSING DEVICE, PROGRAM, AND STORAGE MEDIUM

(71) Applicant: SZ DJI TECHNOLOGY CO., LTD., Shenzhen (CN)

(72) Inventors: Lei Gu, Tokyo (JP); Xiangwei Wang, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 161 days.

(21) Appl. No.: 16/657,569

(22) Filed: Oct. 18, 2019

(65) Prior Publication Data

US 2020/0050189 A1 Feb. 13, 2020

Related U.S. Application Data

(63) Continuation of application No. PCT/JP2017/015887, filed on Apr. 20, 2017.

(51) Int. Cl.
| | | |
|---|---|---|
| *G05D 1/00* | (2006.01) | |
| *G08G 5/00* | (2006.01) | |
| *G05D 1/08* | (2006.01) | |
| *G01M 1/12* | (2006.01) | |
| *G05D 1/10* | (2006.01) | |

(52) U.S. Cl.
CPC .............. *G05D 1/10* (2013.01); *G01M 1/125* (2013.01); *G05D 1/0027* (2013.01); *G05D 1/0808* (2013.01); *G08G 5/003* (2013.01); *G08G 5/0017* (2013.01)

(58) Field of Classification Search
None
See application file for complete search history.

(56) References Cited

U.S. PATENT DOCUMENTS

| | | | | |
|---|---|---|---|---|
| 9,417,070 B1* | 8/2016 | Herriot | .................. | G01C 21/00 |
| 9,418,560 B1* | 8/2016 | Rosenwald | ........... | B64C 39/024 |
| 2015/0006078 A1* | 1/2015 | Dorfmann | .............. | G01C 23/00 |
| | | | | 701/533 |
| 2016/0210865 A1* | 7/2016 | Mizutani | ................ | G01C 21/00 |
| 2018/0231972 A1* | 8/2018 | Woon | ................... | G05D 1/0808 |

FOREIGN PATENT DOCUMENTS

| | | |
|---|---|---|
| CN | 102419598 A | 4/2012 |
| CN | 105511458 A | 4/2016 |
| CN | 105739504 A | 7/2016 |
| CN | 105955294 A | 9/2016 |
| CN | 106227237 A | 12/2016 |
| CN | 106502264 A | 3/2017 |
| JP | 2005205028 A | 8/2005 |
| JP | 2010061216 A | 3/2010 |
| WO | 2016053194 A1 | 4/2016 |

OTHER PUBLICATIONS

World Intellectual Property Organization (WIPO) International Search Report for PCT/JP2017/015887 dated Jul. 25, 2017 3 pages.

* cited by examiner

*Primary Examiner* — Aniss Chad
*Assistant Examiner* — Madison R Hughes
(74) *Attorney, Agent, or Firm* — Anova Law Group, PLLC

(57) ABSTRACT

A flight path determination method includes obtaining first information of a predetermined region, obtaining second information of multiple aerial vehicles, dividing the predetermined region into a plurality of sub-regions where the multiple aerial vehicles respectively work based on the second information, and determining a flight path for each of the plurality of sub-regions.

18 Claims, 28 Drawing Sheets

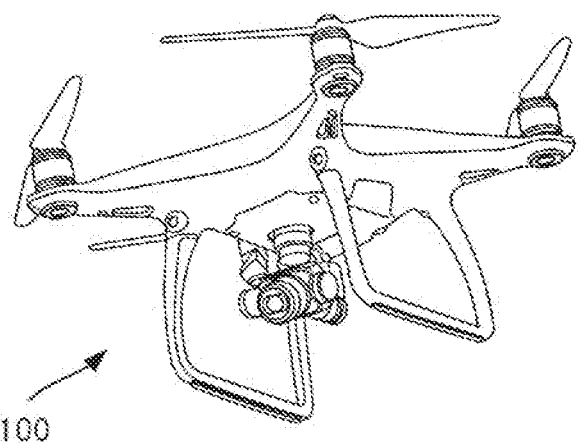
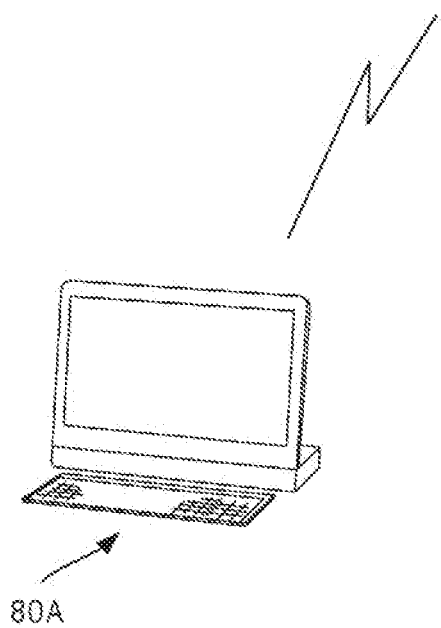
Fig. 2

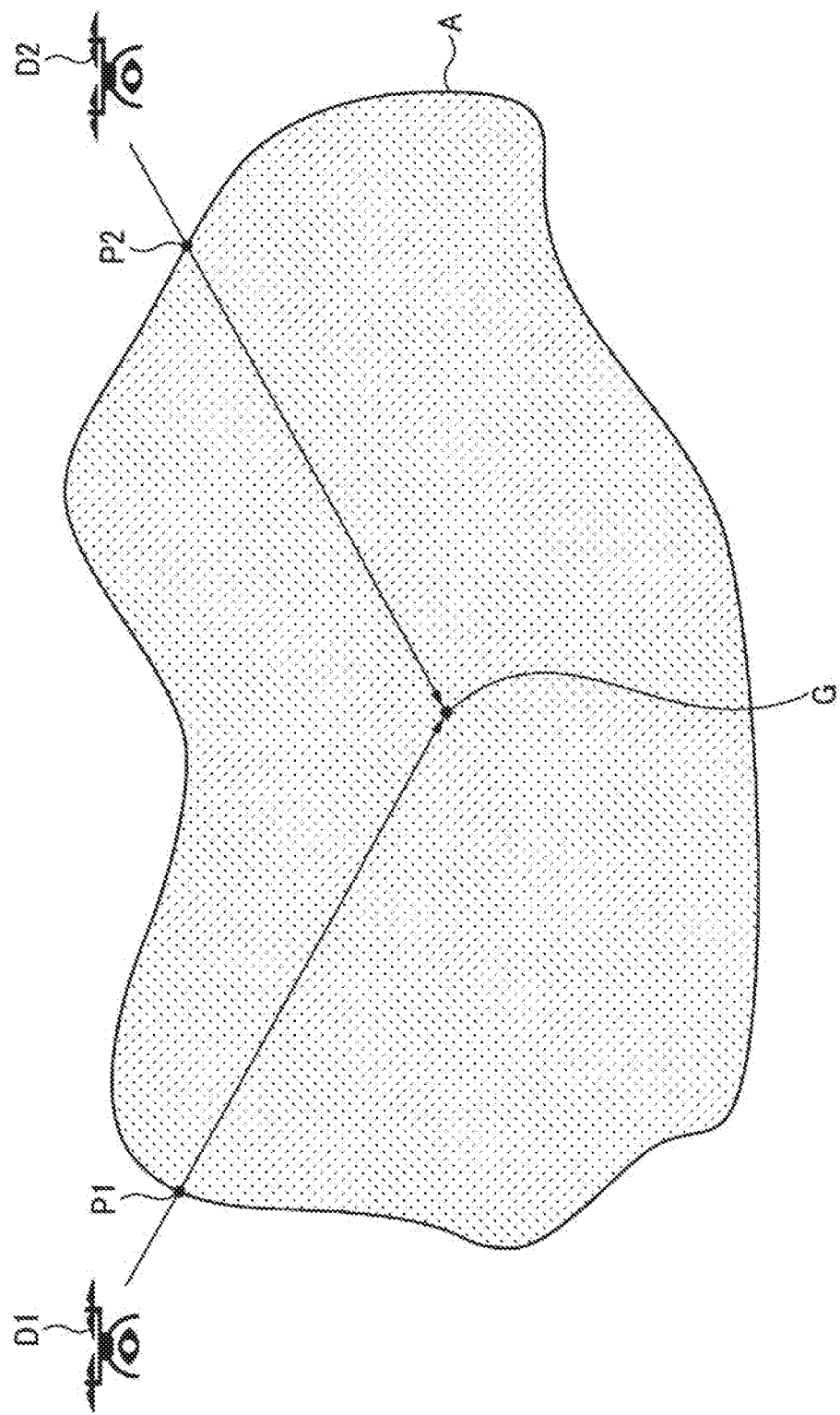

FLIGHT PATH DETERMINATION METHOD, INFORMATION PROCESSING DEVICE, PROGRAM, AND STORAGE MEDIUM

CROSS-REFERENCE TO RELATED APPLICATION

This application is a continuation of International Application No. PCT/JP2017/015887, filed Apr. 20, 2017, the entire content of which is incorporated herein by reference.

TECHNICAL FIELD

The present disclosure relates to a flight path determination method, an information processing device, a program, and a storage medium that automatically divide a predetermined region into regions for each aerial vehicle and determine a flight path in each region when multiple aerial vehicles work in the predetermined region.

BACKGROUND ART

There are various known aerial vehicles (for example, an unmanned aerial vehicle) which carry out various tasks, such as aerial photography with an imaging device such as a camera, or spraying water, agricultural chemicals, fertilizer, etc., in a predetermined region while flying along a preset path (for example, see Patent Document 1). The aerial vehicle receives a command, such as a flight path, work execution (for example, aerial photography or spraying), etc., from a ground base, and flies and works according to the command.

In addition, in order to make the done work automatic by means of an unmanned aerial vehicle, a technique for generating a flight path for the unmanned aerial vehicle in advance is used. When working in a predetermined region by using the unmanned aerial vehicle, it is necessary for the unmanned aerial vehicle to fly according to the flight path generated in advance and work at different positions on the flight path.

Patent Document 1: JP-A-2010-61216

SUMMARY OF THE DISCLOSURE

It is known that in order to improve working efficiency, multiple unmanned aerial vehicles fly simultaneously and work.

However, conventionally, respective flight regions for multiple unmanned aerial vehicles should be set manually, and the larger the number of unmanned aerial vehicles, the more complicated the setting of a flight region for each unmanned aerial vehicle, which is a significant burden for the user. In addition, in the case of manual operation, the work region cannot be accurately divided into sub-regions where multiple unmanned aerial vehicles work, and in some regions, work is sometimes omitted or overlaps.

In addition, even if the predetermined region is automatically divided into flight regions where each of the aerial vehicles respectively works, simply, the predetermined region is mechanically and evenly divided, and attributes (for example, the starting position, work efficiency, remaining battery capacity, maximum flight distance, etc.) of each unmanned aerial vehicle are not considered. For this reason, there is the problem that a useless flight path is set or that the amount of work for each unmanned aerial vehicle is not distributed appropriately, and the work cannot be carried out effectively.

In one aspect, a flight path determination method by which multiple aerial vehicles work in a predetermined region includes a step of obtaining information about the predetermined region, a step of obtaining information about the multiple aerial vehicles, a step of dividing, based on the information about the multiple aerial vehicles, the predetermined region into a plurality of sub-regions where the multiple aerial vehicles respectively work, and a step of determining a flight path for each of the plurality of sub-regions.

The information about the multiple aerial vehicles includes information about the starting position of each aerial vehicle, and the step of dividing the predetermined region into the plurality of sub-regions may include a step of determining, based on the information about the starting position of each aerial vehicle, a work starting position of the predetermined region, and a step of dividing, based on a work starting position of each aerial vehicle, the predetermined region into the plurality of sub-regions.

The step of determining, based on the information about the starting position, the work starting position of the predetermined region may include a step of determining the position where a straight line connecting the starting position and the center of gravity of the predetermined region intersects with the outer periphery of the predetermined region to be the work starting position.

The step of determining, based on the information about the starting position, the work starting position of the predetermined region may include a step of determining the position closest to the starting position in the predetermined region to be the work starting position.

When there are multiple aerial vehicles, the starting positions of which are concentrated by a predetermined degree or higher, the step of determining, based on the information about the starting position, the work starting position of the predetermined region may include a step of determining the positions where multiple straight lines, which are radially dispersed to the predetermined region from the starting position, intersect with the outer periphery of the predetermined region to be the starting position of each aerial vehicle.

The information about the aerial vehicles further includes information about the work efficiency of the aerial vehicles, and the step of dividing the predetermined region into a plurality of sub-regions may include a step of dividing the predetermined region into a plurality of sub-regions so that an area ratio corresponding to the work efficiency of each aerial vehicle is obtained.

The method may further include a step of displaying at least one of the plurality of sub-regions after the predetermined region is divided into the plurality of sub-regions.

The method may further include a step of displaying the flight path after the flight path is determined for each of the sub-regions.

The method may include a step of transmitting information about the flight path on which work is carried out to each of the multiple aerial vehicles after the flight path is determined for each of the sub-regions.

In one aspect, an information processing device, which is capable of communicating with multiple aerial vehicles that carry out work after a predetermined region is divided, includes a processing unit, which obtains information about the predetermined region, obtains information about the multiple aerial vehicles, divides, based on the information about the multiple aerial vehicles, the predetermined region into a plurality of sub-regions where the multiple aerial vehicles respectively work, and determines a flight path for each of the plurality of sub-regions.

The information about the multiple aerial vehicles includes information about a starting position of each aerial vehicle, and for each aerial vehicle, the processing unit may determine, based on the information about the starting position, the work starting position of the predetermined region, and divide, based on the work starting position of each aerial vehicle, the predetermined region into a plurality of sub-regions.

The processing unit may determine the position where a straight line connecting the starting position and the center of gravity of the predetermined region intersects the outer periphery of the predetermined region to be the work starting position.

The processing unit may determine the position closest to the starting position in the predetermined region to be the work starting position.

When there are multiple aerial vehicles, the starting positions are concentrated by a predetermined degree or higher, the processing unit may determine the positions where multiple straight lines, which are radially dispersed to the predetermined region from the starting position, intersect with the outer periphery of the predetermined region to be the work starting position of each aerial vehicle.

The information about the aerial vehicles further includes information about the work efficiency of the aerial vehicles, and the processing unit may divide the predetermined region into a plurality of sub-regions so that an area ratio corresponding to the work efficiency of each aerial vehicle is obtained.

Further, the processing unit, which includes a display unit, may display at least one of the plurality of sub-regions after the predetermined region is divided into the plurality of sub-regions.

Further, the processing unit, which includes a display unit, may display the flight path after the flight path is determined for each of the sub-regions.

The processing unit may transmit information about the flight path on which work is carried out to each of the multiple aerial vehicles after the flight path is determined for each of the sub-regions.

In one aspect, a program causes an information processing device, which is capable of communicating with multiple aerial vehicles working in a predetermined region, to execute the following steps: obtaining information about a predetermined region; obtaining information about multiple aerial vehicles; dividing, based on the information about the multiple aerial vehicles, the predetermined region into a plurality of sub-regions where the multiple aerial vehicles respectively work; and determining a flight path for each of the plurality of sub-regions.

In one aspect, a computer-readable storage medium stores a program which causes an information processing device, which is capable of communicating with multiple aerial vehicles working in a predetermined region, to execute the following steps: obtaining information about a predetermined region; obtaining information about multiple aerial vehicles; dividing, based on the information about the multiple aerial vehicles, the predetermined region into a plurality of sub-regions where the multiple aerial vehicles respectively work; and determining the flight path for each of the plurality of sub-regions.

Incidentally, the above summary does not enumerate all the features of the present disclosure. In addition, sub-combinations of these feature groups can also be embodiments of the disclosure.

BRIEF DESCRIPTION OF THE DRAWINGS

FIG. 2 is a diagram illustrating an example of the configuration of a system for executing a flight path determination method.

FIG. 9 is a diagram illustrating an example of determining a work starting position in the predetermined region.

DETAILED DESCRIPTION OF THE EMBODIMENTS

Figure 1:
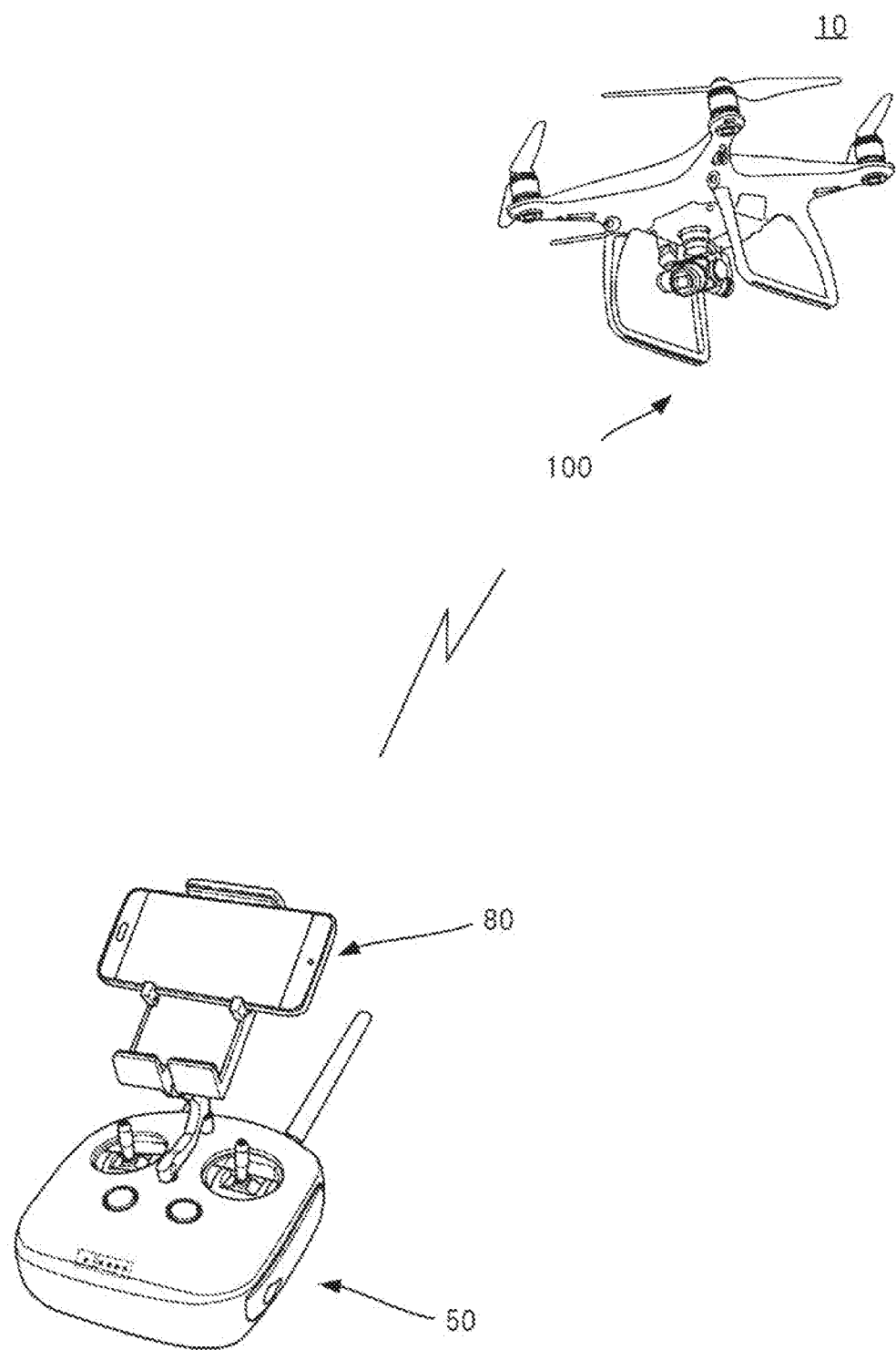
FIG. 1 is a diagram illustrating an example of the configuration of a system for executing a flight path determination method.

Hereinafter, the present disclosure will be described by means of embodiments of the disclosure, but the following embodiments are not intended to limit the disclosure according to the claims. None of the combinations of the features described in the embodiments is necessarily essential to the solution means of the disclosure.

The claims, specification, drawings, and abstract include items that are subject to copyright protection. The copyright holder does not object to the copying, by any person, of these documents, as long as they are appear on the file or record of the Patent Office. However, in all other cases, all copyrights are reserved.

A flight path determination method according to the present disclosure defines various processes (steps) in an information processing device for determining a flight path of an aerial vehicle. The aerial vehicle includes an aircraft moving through the air (for example, drones, helicopters, etc.). The aerial vehicle may be an unmanned aerial vehicle (UAV) and flies along a pre-set flight path in order to carry out tasks such as aerial photography, the spraying of water, fertilizer, agricultural chemicals, etc.

An information processing device according to the present disclosure is a computer, for example, a transmitter for instructing the remote control of various processes including the movement of the unmanned aerial vehicle; a terminal device which is connected to the transmitter so that information and data can be input and output; or a PC, tablet, or the like, which is connected to the unmanned aerial vehicle so that information and data can be input and output. Incidentally, the unmanned aerial vehicle itself may also include an information processing device.

A program according to the present disclosure is a program for causing an information processing device to execute various processes (steps).

A storage medium according to the present disclosure records a program (i.e., the program for causing the information processing device to execute various processes (steps)).

In each example according to the present disclosure, multiple unmanned aerial vehicles carry out work after a predetermined region is divided. Hereinafter, a case where an unmanned aerial vehicle equipped with an imaging device carries out aerial photography will be described as an example. However, the present disclosure is not limited thereto, and there may be cases where any other operation, such as the spraying of water or agricultural chemicals, is carried out.

In each example according to the present disclosure, the information processing device can communicate with multiple aerial vehicles, and can transmit information about divided regions and/or information about a determined flight path to each of the corresponding aerial vehicles. The term "communicate" referred to here is a broad concept including general data communication, and includes not only wired connection using a cable or the like but also a connection through wireless communication. Further, not only is the case where the information processing device directly communicates with aerial vehicles included, but the case where communication is carried out indirectly via a transmitter or a storage medium is also included.

FIG. 1 is a diagram illustrating an example of the configuration of a system for executing a flight path determination method of the present disclosure. The system 10 shown in FIG. 1 at least includes an unmanned aerial vehicle 100, a transmitter 50, and an information processing device 80. The unmanned aerial vehicles 100 and the transmitter 50 can communicate information and data to each other by using wired communication or wireless communication (for example, a wireless local area network (LAN)) or Bluetooth (registered trademark). The transmitter 50, as an example of an operation terminal, is used in a state of being grasped with both hands of a person using the transmitter 50 (hereinafter referred to as the "user"), for example.

The transmitter 50 is provided with a stand on which the information processing device 80 (for example, a smartphone) is fixed. The information processing device 80 installed on the stand can be connected to the transmitter 50 via a USB cable (which is not shown) or the like. In this case, information is first transmitted from the information processing device 80 to the transmitter 50, and then, the information is transmitted to the unmanned aerial vehicle 100 by the transmitter 50. In some embodiments, the information processing device 80 is a portable terminal such as a smartphone or a tablet, but is not limited thereto, and may be any device having an arithmetic function, such as a notebook PC, a desktop PC or the like.

FIG. 2 is a diagram illustrating another example of the configuration of the system for executing the flight path determination method of the present disclosure. The system 10A shown in FIG. 2 includes an unmanned aerial vehicle 100 and an information processing device 80A. In this configuration example, the information processing device 80A communicates with the unmanned aerial vehicle 100 without using a transmitter 50. For example, the information processing device 80A and the unmanned aerial vehicle 100 carry out direct wireless communication. Alternatively, in the information processing device 80A, information is stored in a storage such as a flash memory, and then, the aerial vehicle reads the information and transmits data.

The system for executing the flight path determination method in the present disclosure is not limited to the configuration examples described in FIGS. 1 and 2. For example, the transmitter 50 can act as the information processing device 80, and in this case, the system may include only the unmanned aerial vehicle 100 and the transmitter 50. In addition, the unmanned aerial vehicle 100 itself can act as the information processing device 80. In this case, the flight path determination method in the present disclosure can be executed by the unmanned aerial vehicle 100 alone. However, the following description is made based on the configuration example shown in FIG. 1.

Figure 3:
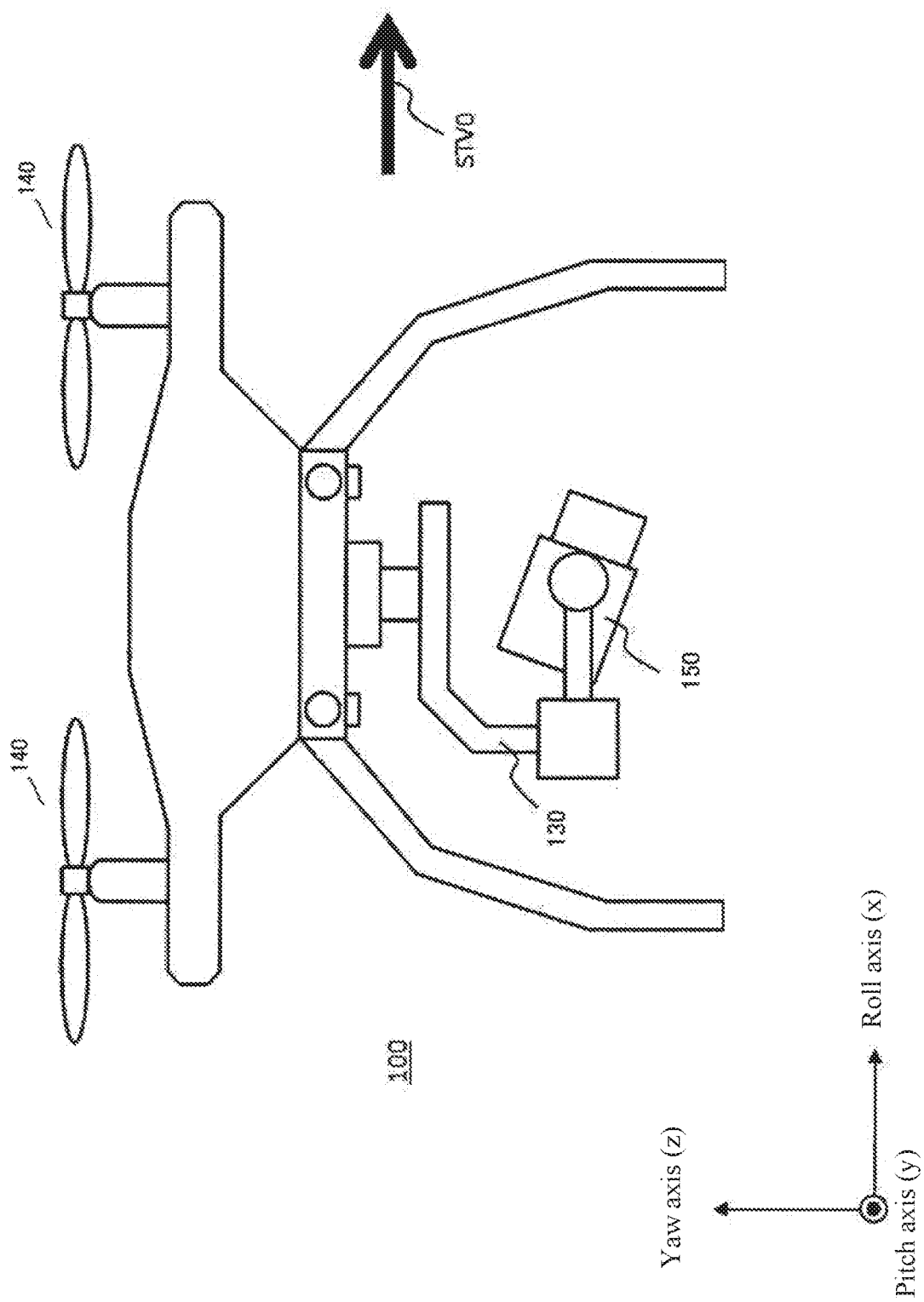
FIG. 3 is a diagram illustrating an example of the appearance of an unmanned aerial vehicle.
Figure 4:
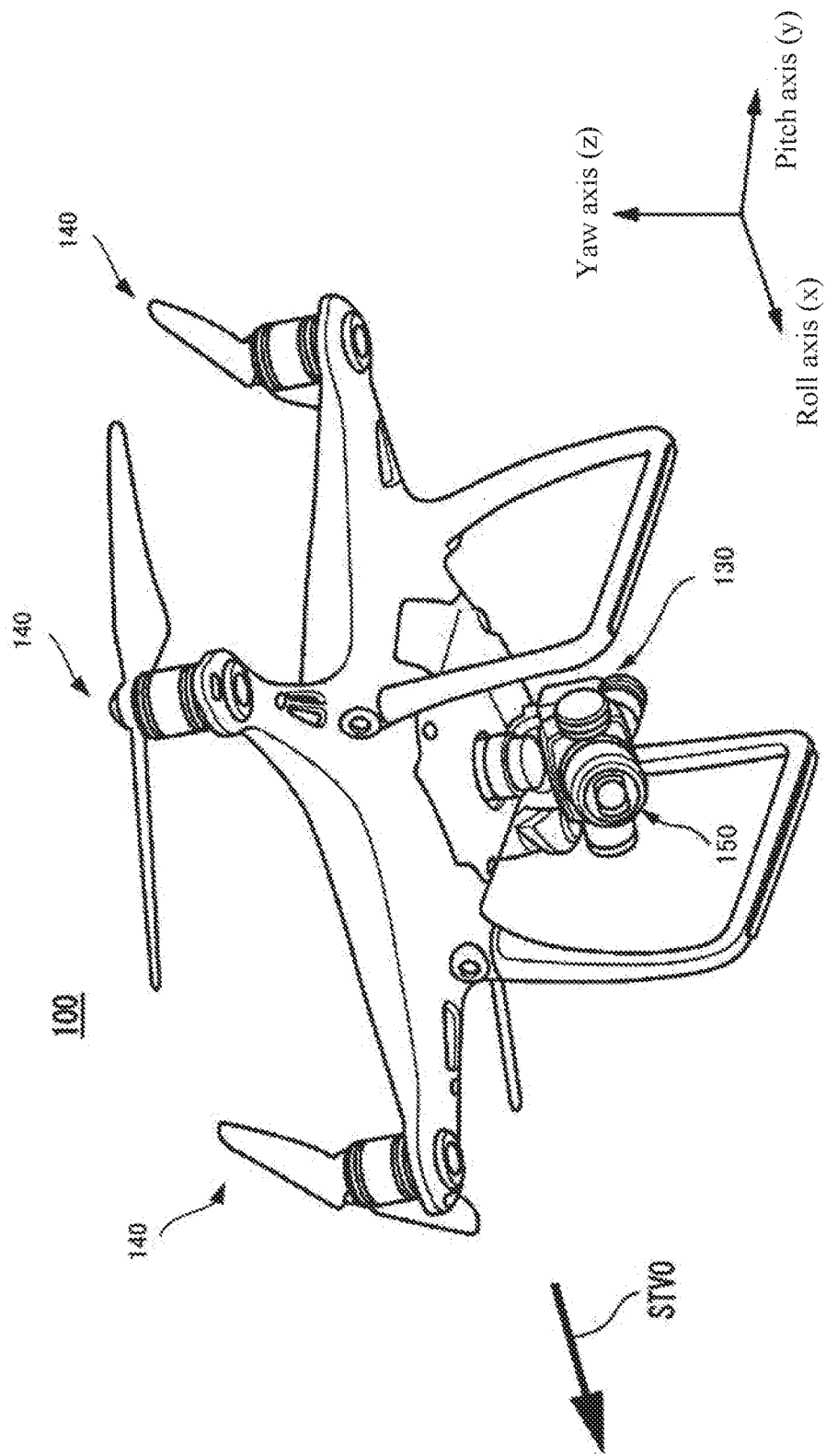
FIG. 4 is a diagram illustrating an example of the specific appearance of the unmanned aerial vehicle.

FIG. 3 is a diagram illustrating an example of the appearance of an unmanned aerial vehicle 100. FIG. 4 is a diagram illustrating an example of the specific appearance of the unmanned aerial vehicle 100. A side view of the unmanned aerial vehicle 100 flying in a moving direction STV 0 is shown in FIG. 3, and a perspective view of the unmanned air vehicle 100 flying in the moving direction STV 0 is shown in FIG. 4. The unmanned aerial vehicle 100 includes, for example, an imaging device 150 so as to carry out an aerial photography task. Here, as shown in FIGS. 3 and 4, a roll axis (see the x axis in FIGS. 3 and 4) is defined as a direction parallel to the ground and along the moving direction STV 0. In this case, a pitch axis (see the y axis in FIGS. 3 and 4) is defined as a direction parallel to the ground and perpendicular to the roll axis, further, a yaw axis (see the z axis in FIGS. 3 and 4) is defined as a direction perpendicular to the ground and perpendicular to the roll axis and the pitch axis.

The unmanned aerial vehicle 100 includes a gimbal 130, a rotary wing mechanism 140, and an imaging device 150. The unmanned aerial vehicle 100 can move based on, for example, a remote control instruction transmitted from the transmitter 50. The movement of the unmanned air vehicle 100 refers to flying and at least includes a flight of ascending, descending, a left turn, a right turn, a left horizontal movement and a right horizontal movement.

The unmanned aerial vehicle 100 includes, for example, four rotary wing mechanisms 140. The unmanned aerial vehicle 100 moves itself by controlling the rotation of these rotary wing mechanisms 140. However, the number of rotary wings is not limited to four. Further, the unmanned aerial vehicle 100 may also be a fixed-wing aircraft without rotary wings The imaging device 150 is a camera photographing a subject (for example, the above-mentioned ground shape of buildings, roads, parks, etc.) included in a desired photograpy range. The imaging device 150 is attached to the gimbal 130, and the photography range is adjusted by the movement of the gimbal 130.

Next, an example of the configuration of the unmanned aerial vehicle 100 will be described.

Figure 5:
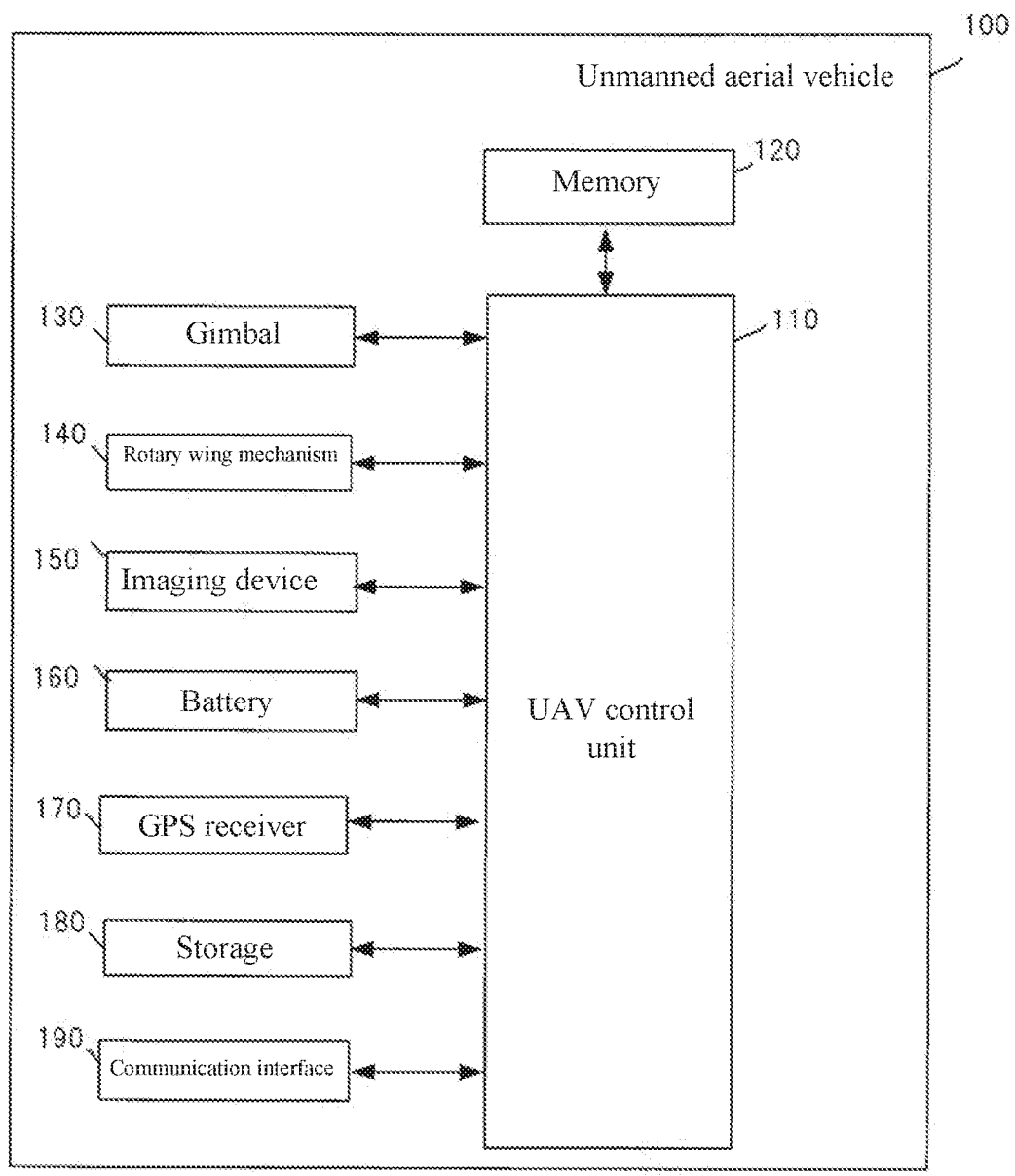
FIG. 5 is a block diagram illustrating an example of the hardware configuration of the unmanned aerial vehicle.

FIG. 5 is a block diagram illustrating an example of the hardware configuration of an unmanned aerial vehicle 100. The unmanned aerial vehicle 100 includes a UAV control unit 110, a memory 120, a gimbal 130, a rotary wing mechanism 140, an imaging device 150, a battery 160, a GPS receiver 170, a storage 180 and a communication interface 190. In the case of the unmanned aerial vehicle 100 carrying out the spraying of water and agricultural chemicals, a container for storing water and agricultural chemicals and a spraying nozzle for spraying water and agricultural chemicals may be included in place of the imaging device 150 or in addition to the imaging device 150.

The UAV control unit 110 is configured by using, for example, a central processing unit (CPU), a micro processing unit (MPU) or a digital signal processor (DSP). The UAV control unit 110 carries out signal processing for integrating and controlling operations of each unit of the unmanned aerial vehicle 100, the input/output processing of data with other units, data arithmetic processing and data storage processing.

The UAV control unit 110 controls, according to the program stored in the memory 120 or the storage 180 and information related to the flight path, the flight of the unmanned aerial vehicle 100. In addition, the UAV control unit 110 controls, according to a command received from the remote transmitter 50 via the communication interface 190, the movement (i.e., flight) of the unmanned aerial vehicle 100.

The memory 120 includes, for example, a random access memory (RAM) for temporarily saving various pieces of information and data used in the processing of the UAV control unit 110. The memory 120 may be provided inside the unmanned aerial vehicle 100 and may be arranged such that same can be removed from the unmanned aerial vehicle 100.

The gimbal 130 supports the imaging device 150 such that same can rotate around at least one axis. The gimbal 130 may support the imaging device 150 such that same can rotate around the yaw axis, the pitch axis, and the roll axis. The gimbal 130 may change the photographing direction of the imaging device 150 by rotating the imaging device 150 around the center of at least one of the yaw axis, the pitch axis and the roll axis.

The rotary wing mechanism 140 includes a plurality of rotary wings and a plurality of drive motors for rotating the plurality of rotary wings. By controlling the rotation of the rotary wings, an airflow in a specific direction is generated and the flight (the ascending, descending, horizontal moving, turning, inclining, etc.) of the unmanned aerial vehicle 100 is controlled.

The imaging device 150 captures an image of a subject in a desired photography range and generates data of the captured image. The captured image may be a moving image or a still image. The data acquired by the capturing of the imaging device 150 is stored in a memory of the imaging device 150 or the memory 120, the storage 180, etc.

The battery 160 functions as a drive source for each part of the unmanned aerial vehicle 100, and supplies the necessary power to each part of the unmanned aerial vehicle 100.

The GPS receiver 170 receives a plurality of signals which are transmitted from a plurality of navigation satellites (i.e., GPS satellites) and which indicate the time and the position (coordinates) of each GPS satellite. The GPS receiver 170 calculates, based on the received plurality of signals, the position of the GPS receiver 170 (i.e., the position of the unmanned aerial vehicle 100). The GPS receiver 240 outputs position information about the unmanned aerial vehicle 100 to the UAV control unit 110. Incidentally, the calculation of the position information about the GPS receiver 170 may be carried out by the UAV control unit 110 instead of the GPS receiver 170. In this case, the time included in the plurality of signals received by the GPS receiver 170 and the information indicating the position of each GPS satellite are input to the UAV control unit 110.

The storage 180 is a storage medium such as an HDD, a flash memory, etc., and stores programs which are necessary for the UAV control unit 110 to control the gimbal 130, the rotary wing mechanism 140, the imaging device 150, the battery 160 and the GPS receiver 170, and information which is related to the flight path and which is acquired from the information processing device 80. The storage 180 may be able to be removed from the unmanned aerial vehicle 100 or may be housed by the unmanned aerial vehicle 100.

The communication interface 190 communicates with the transmitter 50 or the information processing device 80. The communication interface 190 receives various instructions from the remote transmitter 50 regarding the UAV control unit 110.

Next, the information processing device 80 will be described. Hereinafter, the case where the information processing device 80 is a smartphone attached to the transmitter 50 as shown in FIG. 1 will be described, but the information processing device 80 is not limited to a smartphone, and may also be a tablet, a notebook PC, a desktop PC or the like. In addition, the transmitter 50 and the unmanned aerial vehicle 100 itself can act as the information processing device 80.

Figure 6:
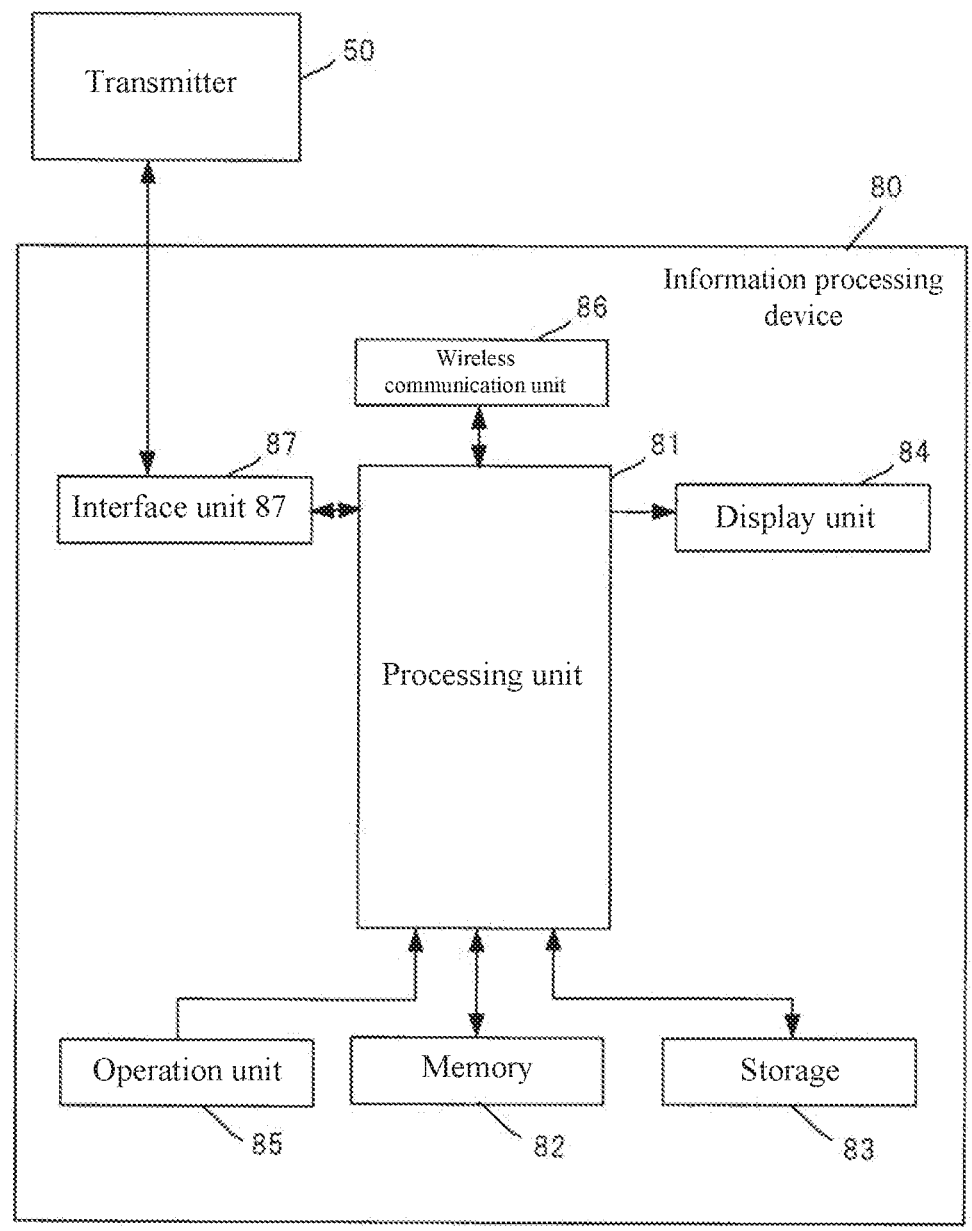
FIG. 6 is a block diagram illustrating an example of the hardware configuration of an information processing device.

FIG. 6 is a block diagram illustrating an example of the hardware configuration of the information processing device 80. The information processing device 80 may include a processing unit 81, a memory 82, a storage 83, a display unit 84, an operation unit 85, a wireless communication unit 86 and an interface unit 87.

The processing unit 81 is configured by using a processor (for example, a CPU, an MPU or a DSP). The processing unit 81 carries out signal processing for controlling the memory 82, the storage 83, the display unit 84, the operation unit 85, the wireless communication unit 86 and the interface unit 87, the input/output processing of data with other units, data arithmetic processing and data storage processing.

The memory 82 is, for example, a random access memory (RAM) for temporarily saving various pieces of information and data used in the processing of the processing unit 81. The memory 82 may be provided inside the information processing device 80 and may be arranged such that same can be removed from the information processing device 80.

The storage 83 is a storage medium such as a read-only memory (ROM), an HDD, an SSD, a USB memory, in which various programs and data of set values are stored. The storage 83 may be able to be removed from the information processing device 80 or may be housed by the unmanned aerial vehicle 80.

The display unit 84 is provided to display information to the outside and may be configured by using, for example, a liquid crystal display (LCD) or a light-emitting diode (LED).

The operation unit 85 is a keyboard, a mouse, a touch panel, or the like, and accepts various inputs from the user. A touch panel display can also be constructed by overlapping same with the display, which is the display unit 84.

The wireless communication unit 86 is, for example, an electromagnetic wave antenna or the like, which carries out transmission with the outside by using a wireless LAN, Wi-Fi (registered trademark), Bluetooth (registered trademark), or the like.

The interface unit 87 is, for example, a USB port, which is an interface for transmission with the transmitter 50.

Hereinafter, each embodiment of the processes in the flight path determination method according to the present disclosure will be described with reference to the drawings. In the flight path determination method according to the present disclosure, one work region is divided, and multiple unmanned aerial vehicles 100 respectively work in each divided sub-region.

Figure 7:
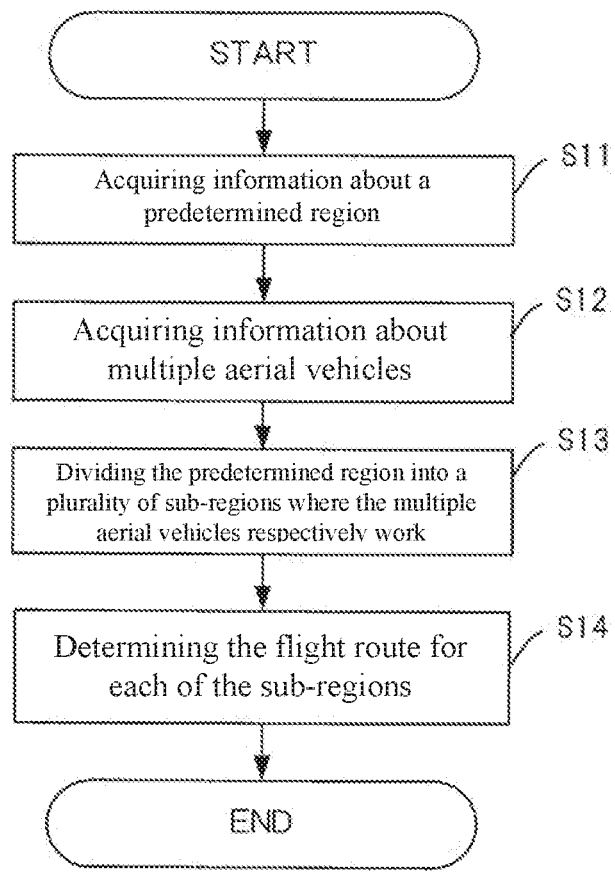
FIG. 7 is a flow diagram illustrating a flight path determination method in the present disclosure.

FIG. 7 is a flow diagram illustrating a flight path determination method in the present disclosure.

First, the information processing device 80 acquires information related to a predetermined region, which is the target of the work (step S11). For example, the information related to the predetermined region may include information indicating the coordinates of the predetermined region on the map, and may include parameters of the longitude and latitude, for example.

The information processing device 80 may acquire information related to the predetermined region from the wireless communication unit 86 or may receive, from the operation unit 85, an input from the user. For example, the information processing device 80 displays a map on a touch panel display which functions as both the display unit 84 and the operation unit 85, and a user may then receive, based on the displayed map, information related to a predetermined region specified by a drag operation or a tap operation.

Second, the information processing device 80 acquires information related to multiple aerial vehicles which carry out work (step S12). The information related to the aerial vehicles represents the attributes of the unmanned aerial vehicles 100, and may include one or more of, for example, the starting position, the remaining battery capacity, the maximum flight distance, the flight speed, the work efficiency (the spraying amount per unit of time, etc.) of the unmanned aerial vehicles.

The "starting position" referred to here is the position where the unmanned aerial vehicle 100 is standing by at the start of the operation of the flight path determination method of the present disclosure. However, the unmanned aerial vehicle 100 in the starting position is not limited to a state in which the power supply is off, and may be in any other state, such as hovering. For example, when the unmanned aerial vehicle 100 is standing by at the base, the starting position is the position of the base. Hereinafter, the starting position of the unmanned aerial vehicle 100 is also referred to as an initial position of the unmanned aerial vehicle 100.

In addition, the information processing device 80 may acquire, from the unmanned aerial vehicle 100, information related to the aerial vehicles via the wireless communication unit 86 or may receive an input from the user via the operation unit 85. Further, when multiple aerial vehicles are managed by one management server, the above information may be acquired from the server.

The information processing device 80 is not limited to the above-described order and may simultaneously acquire information related to the predetermined region and information related to the aerial vehicles (i.e., step S11 and step S12 are executed at the same time), or acquire information related to the aerial vehicles before acquiring the information related to the predetermined region (i.e., step S12 is executed before the execution of step S11).

Then, the information processing device 80 divides, based on the acquired information about the multiple aerial vehicles, the predetermined region into a plurality of sub-regions where the multiple aerial vehicles respectively work (step S13). Specifically, same may be divided in such a way that the total loads of the multiple unmanned aerial vehicles are minimized.

Regarding the methods of division, the division may be carried out by using a region growing method or K-Means, but the method is not limited thereto. Specific steps in the case of division by means of a region growing method will be described later.

The information processing device 80 may divide the predetermined region into a plurality of sub-regions and then display the divided sub-regions by means of the display unit 84. For example, different sub-regions may be displayed using different colours or different symbols. The user may input conditions for determining the flight path after confirming the divided sub-regions. For example, the user may select a path that requires the shortest flight distance in the sub-region, a path that requires the shortest flight time, or the path that saves the most power.

Finally, the information processing device 80 determines the flight path for each of the divided sub-regions (step S14). In some embodiments, the flight path is represented by a set of way points indicating the work starting position, a work ending position and a plurality of passing positions. When the user inputs a condition for determining the flight path, a flight path according to the condition is determined. A specific flight path determination method may use any existing algorithm.

After determining the flight path, the information processing device 80 may display the determined flight path on each sub-region by means of the display unit 84.

Further, the information processing device 80 may transmit information related to a corresponding flight path to each unmanned aerial vehicle after the sub-regions for the multiple unmanned aerial vehicles 100 to work in and the flight path thereof are determined.

Information related to the flight path may be directly transmitted to the unmanned aerial vehicles 100 by means of the information processing device 80 via a wireless or wired communication method, or, the information may be transmitted to the transmitter 50 via the interface unit 87, and then, the transmitter 50 transmits the information to the unmanned aerial vehicles 100. Further, the information may be transmitted by any other method, such as recording the information in a storage medium, such as a memory card, in the information processing device 80, inserting the storage medium into the unmanned aerial vehicle 100, and reading the information.

After respectively receiving each of the flight paths, the unmanned aerial vehicles 100 respectively fly along each of the flight paths to work.

Hereinafter, a specific example will be described, in which when the information related to the aerial vehicles includes the information about the starting position, the information processing device 80 divides the predetermined region into a plurality of sub-regions by means of a region growing method.

Embodiment 1

Figure 8:
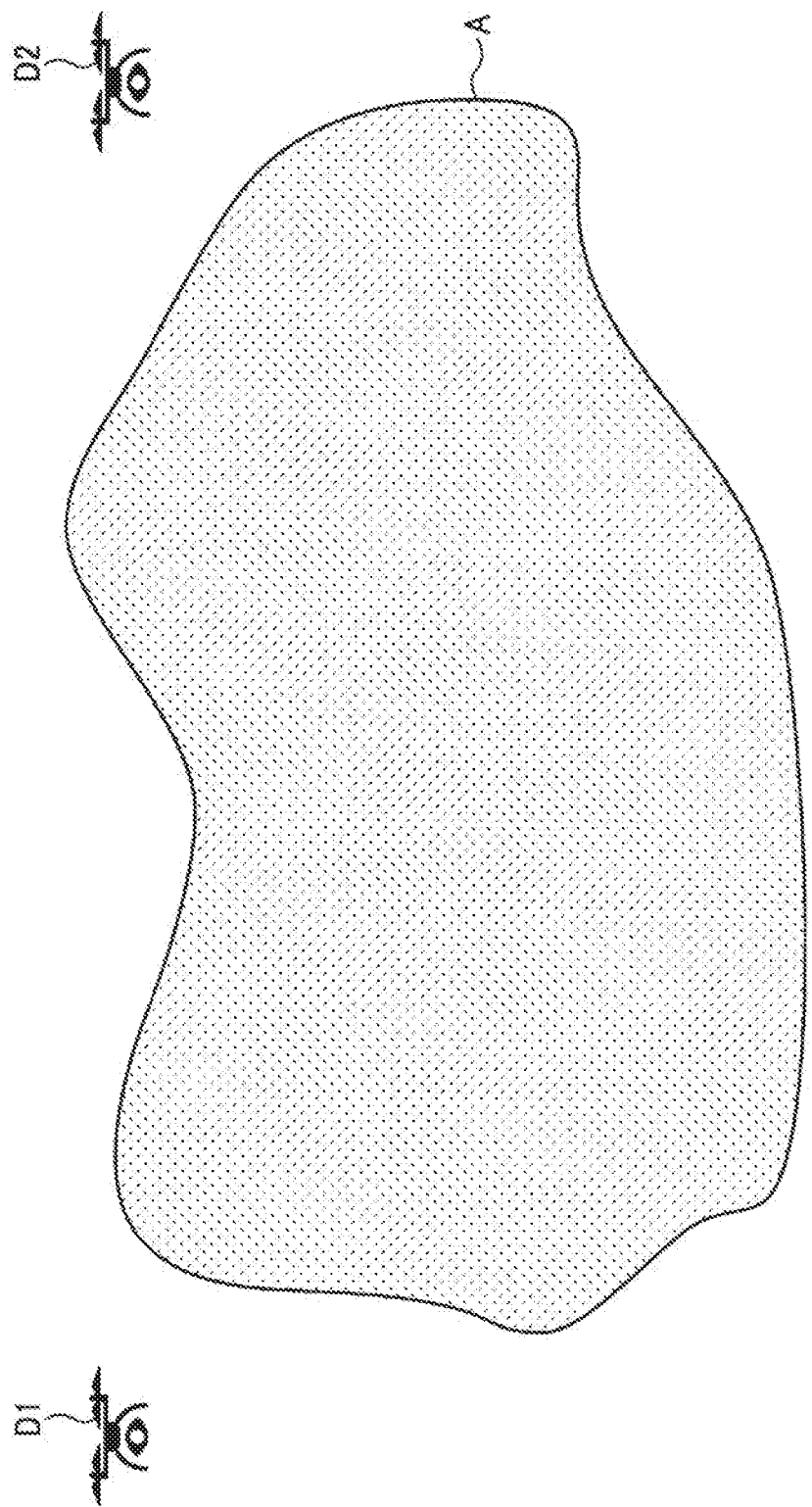
FIG. 8 is a diagram illustrating an example of a starting position of the unmanned aerial vehicle and a predetermined region where work is carried out.

FIG. 8 is a diagram illustrating an example of a starting position and a predetermined region for the work of the multiple unmanned aerial vehicles. As shown in FIG. 8, the case where two unmanned aerial vehicles D1 and D2 standing by at different starting positions divide the region A and carry out work respectively will be described as an example. However, in the present disclosure, the shape of the region A is not limited to the shape shown in FIG. 8, and may be any other shape. In addition, the work to be carried out can be aerial photography, the spraying of agricultural chemicals or water, or any other work.

First, the information processing device 80 first determines, based on the information related to the starting position of the aerial vehicle, the position at which the work is started (hereinafter referred to as the "work starting position") in the predetermined region. That is, the unmanned aerial vehicle 100 firstly moves from the starting position to a predetermined region and starts to work after arriving at the work starting position in the predetermined region.

As shown in FIG. 9, the information processing device 80 calculates the center of gravity G of the region A by means of a conventional method. The positions P1 and P2 where straight lines connecting the starting position of the unmanned aerial vehicles D1 and D2 and the center of gravity G of the predetermined region A intersect the outer periphery of the region A may be set as the work starting positions in the region A. Therefore, the load required for the unmanned aerial vehicles to move to the work starting position can be saved on. However, the method for determining the work starting position is not limited to the method above, for example, the position, closest to the starting position, in the region A may also be set as the work starting position.

Then, the information processing device 80 divides, based on the work starting positions P1 and P2, the region A into a plurality of sub-regions. Hereinafter, specific steps of division will be described with reference to FIGS. 10A to 10G.

The information processing device 80 unitizes the region A into blocks of a predetermined size. In the present embodiment, the information processing device 80 unitizes the region A into square blocks, but same may actually be of other shapes, such as a rectangular shape or a polygonal shape. The size of the block is, for example, 1 m×1 m, but may also be set as other sizes. If the size of the block is large, the load of the arithmetic processing on the information processing device 80 is reduced, but the division accuracy is low. Conversely, if the size of the block is small, the division accuracy increases, but the load of the arithmetic processing on the information processing device 80 increases. Actually, same may be flexibly set based on the accuracy of the operation of the unmanned aerial vehicle or the area that can be processed by a single instance of work (for example, the size of the angle of view of the camera, or the range of spraying).

Figure 10A:
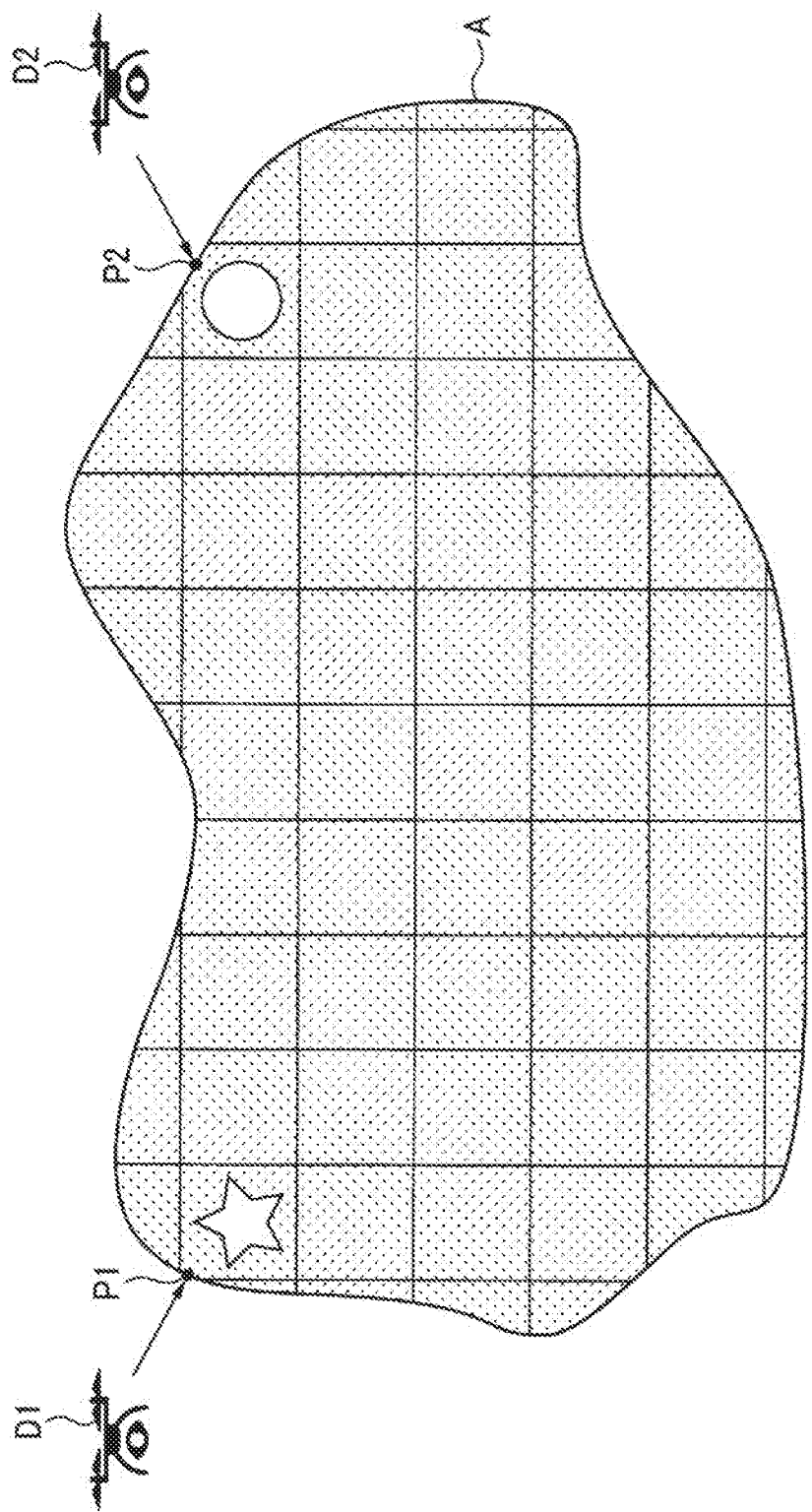
FIG. 10A is a diagram illustrating an example of dividing the predetermined region into sub-regions.

First, as shown in FIG. 10A, the information processing device 80 marks the block to which the work starting position P1 belongs as the region of the unmanned aerial vehicle D1, and marks the block to which the work starting position P2 belongs as the region of the unmanned aerial vehicle D2.

For convenience of explanation, in the following description, a block marked as the region of the unmanned aerial vehicle D1 is denoted as "★" and a block marked as the region of the unmanned aerial vehicle D2 is denoted as "●" before carrying out the described steps. However, a block marked as the region of the unmanned aerial vehicle D1 is denoted as "☆" and a block marked as the region of the unmanned aerial vehicle D2 is denoted as "○" when carrying out the described steps.

Figure 10B:
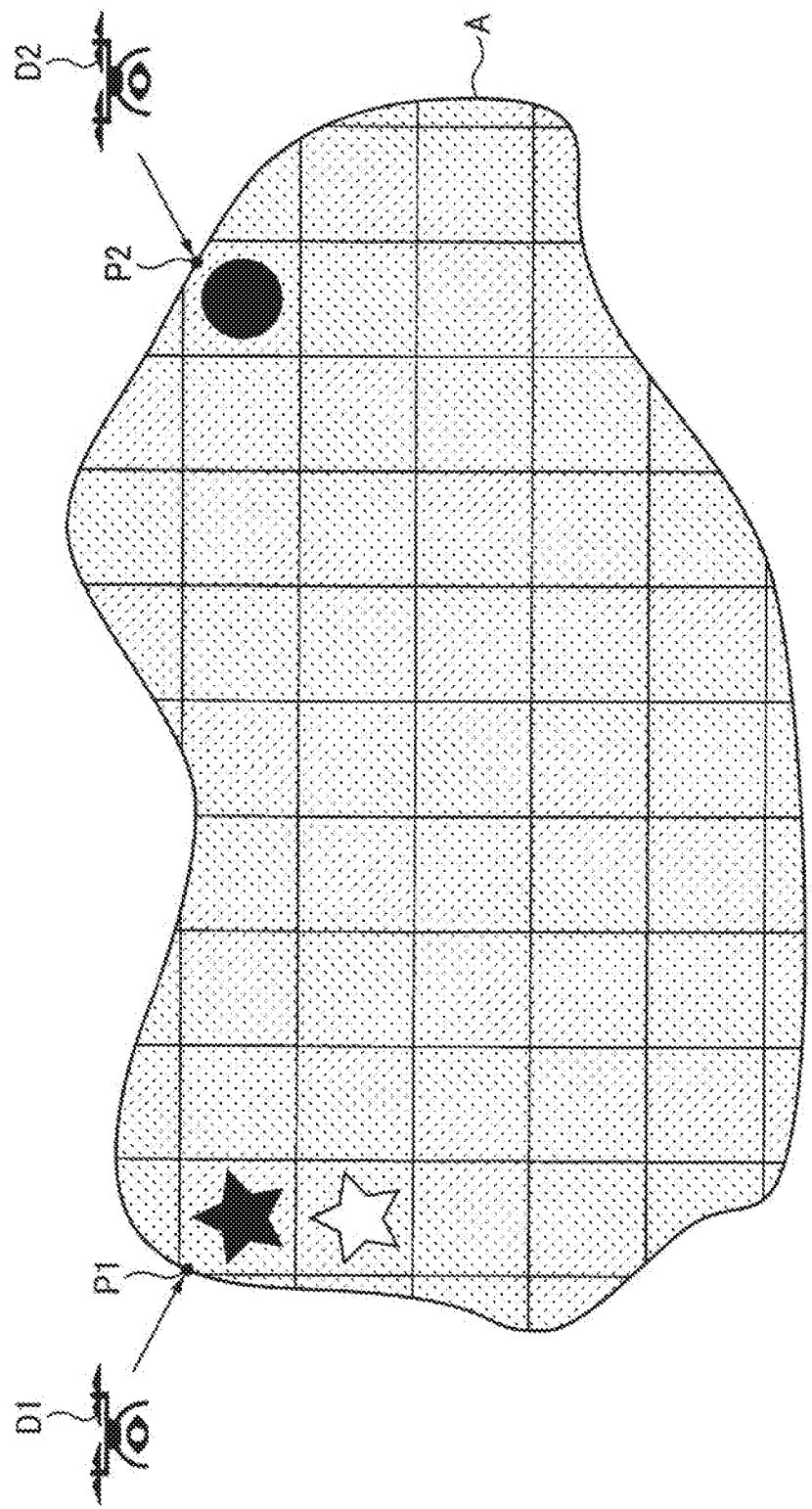
FIG. 10B is a diagram illustrating an example of dividing the predetermined region into sub-regions.

Next, as shown in FIG. 10B, the information processing device 80 marks the block which has the highest load (for example, the farthest away) of movement with respect to the block (see "●") marked as the region of the unmanned aerial vehicle D2 and which is from the unmarked blocks adjacent to the block (see "★") that has been selected as the region of the unmanned aerial vehicle D1 as the region of the unmanned aerial vehicle D1 (see "☆"). At this time, since the adjacent block is near the boundary line of the region A, part of the block may be cut off. If the cut-off area is equal to or larger than a certain threshold value (for example, when more than one third of the area of the block is cut off), the block may be omitted (that is, the block may be excluded from candidates for marking). The omission of a block may be similarly carried out in the steps described later, so for the sake of convenience, duplicate explanation will not be repeated.

Figure 10C:
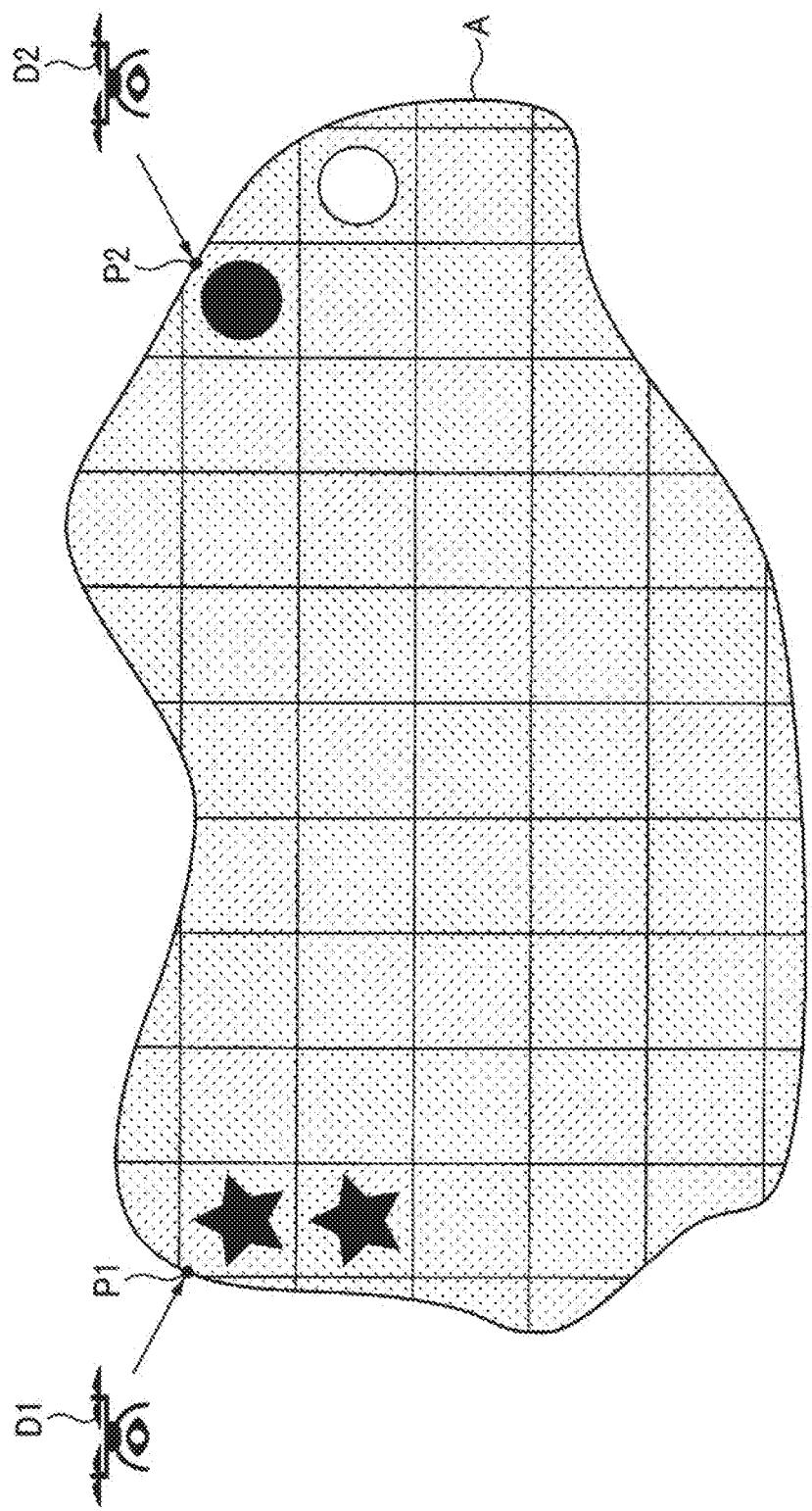
FIG. 10C is a diagram illustrating an example of dividing the predetermined region into sub-regions.

Next, as shown in FIG. 10C, the information processing device 80 marks the block which has the highest load (for example, the farthest away) of movement with respect to the region including the set of blocks (see "★") marked as the region of the unmanned aerial vehicle D1 and which is from the unmarked blocks adjacent to the block (see "●") that has been selected as the region of the unmanned aerial vehicle D2 as the region of the unmanned aerial vehicle D2 (see "○").

Figure 10D:
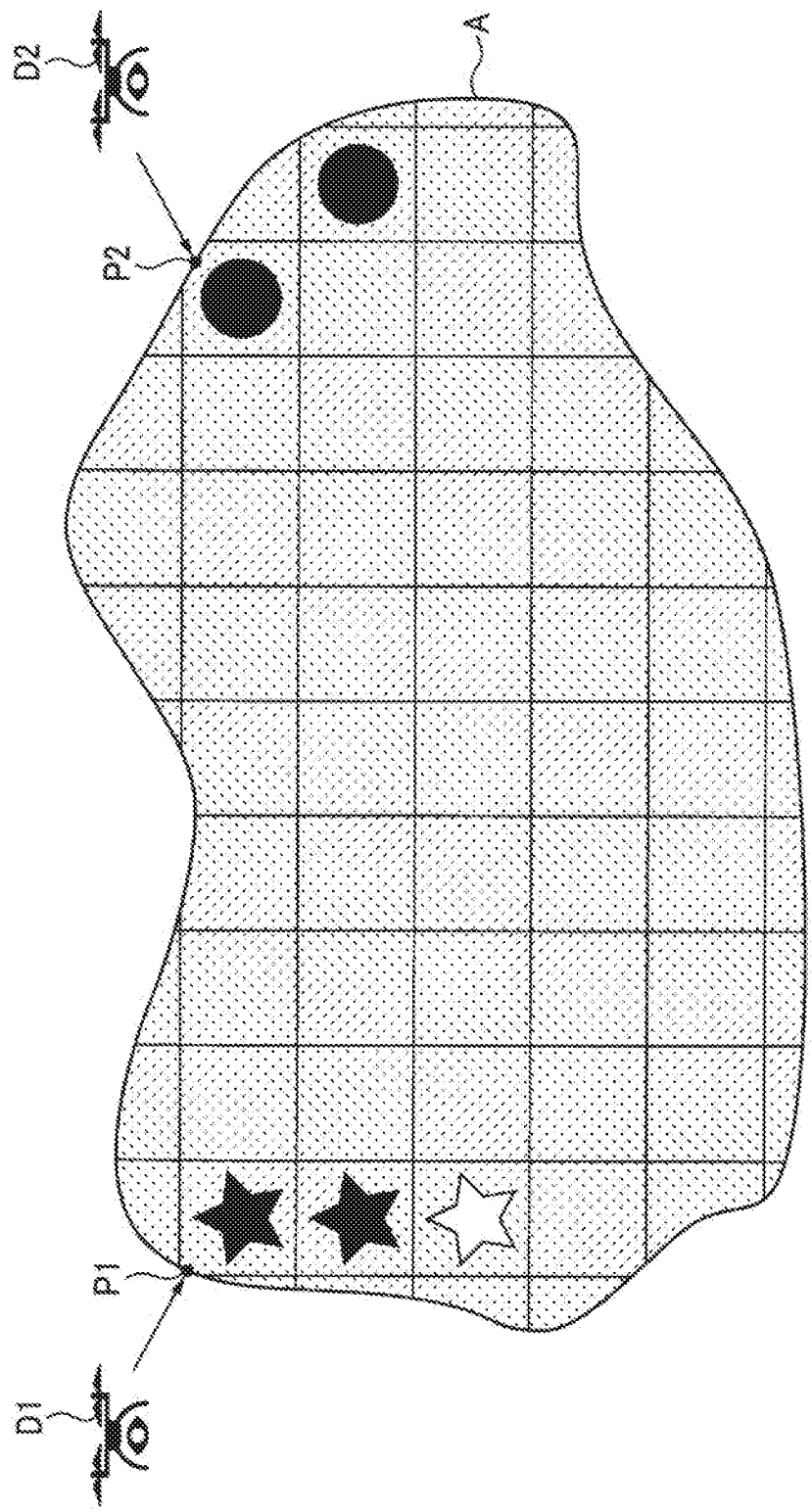
FIG. 10D is a diagram illustrating an example of dividing the predetermined region into sub-regions.

Next, as shown in FIG. 10D, the information processing device 80 marks the block which has the highest load (for example, the farthest away) of movement with respect to the region including a set of blocks (see "●") marked as the region of the unmanned aerial vehicle D2 and which is from the unmarked blocks which are adjacent to the region including a set of blocks (see "★") that have been selected as the region of the unmanned aerial vehicle D1 as the region of the unmanned aerial vehicle D1 (see "☆").

Figure 10E:
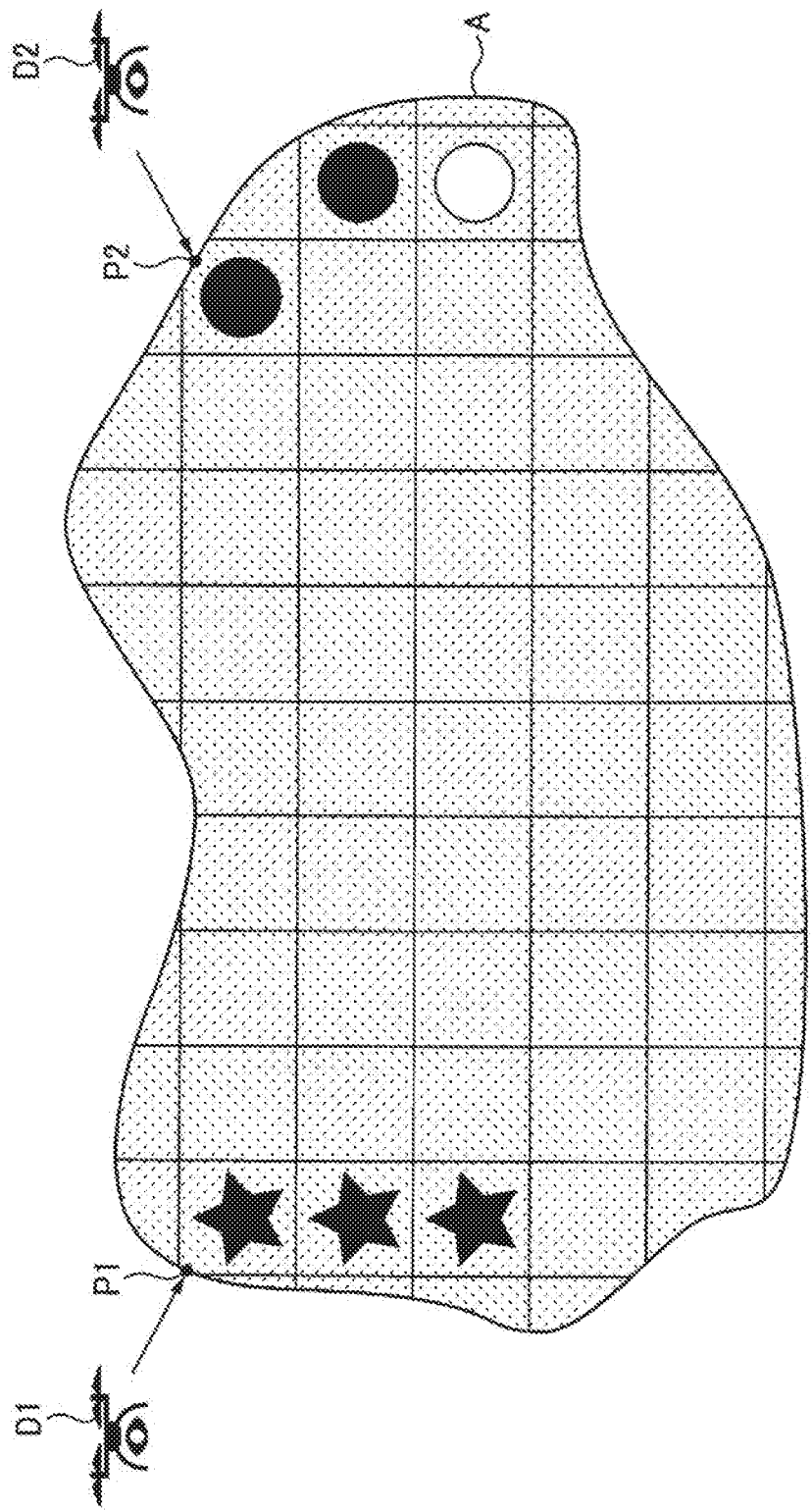
FIG. 10E is a diagram illustrating an example of dividing the predetermined region into sub-regions.

Next, as shown in FIG. 10E, the information processing device 80 marks the block which has with the highest load (for example, the farthest away) of movement with respect to the region including the set of the blocks (see "★") marked as the region of the unmanned aerial vehicle D1 and which is from the unmarked blocks which are adjacent to the region including a set of the block (see "●") that have been selected as the region of the unmanned aerial vehicle D2 as the region of the unmanned aerial vehicle D2 (see "○").

Figure 10F:
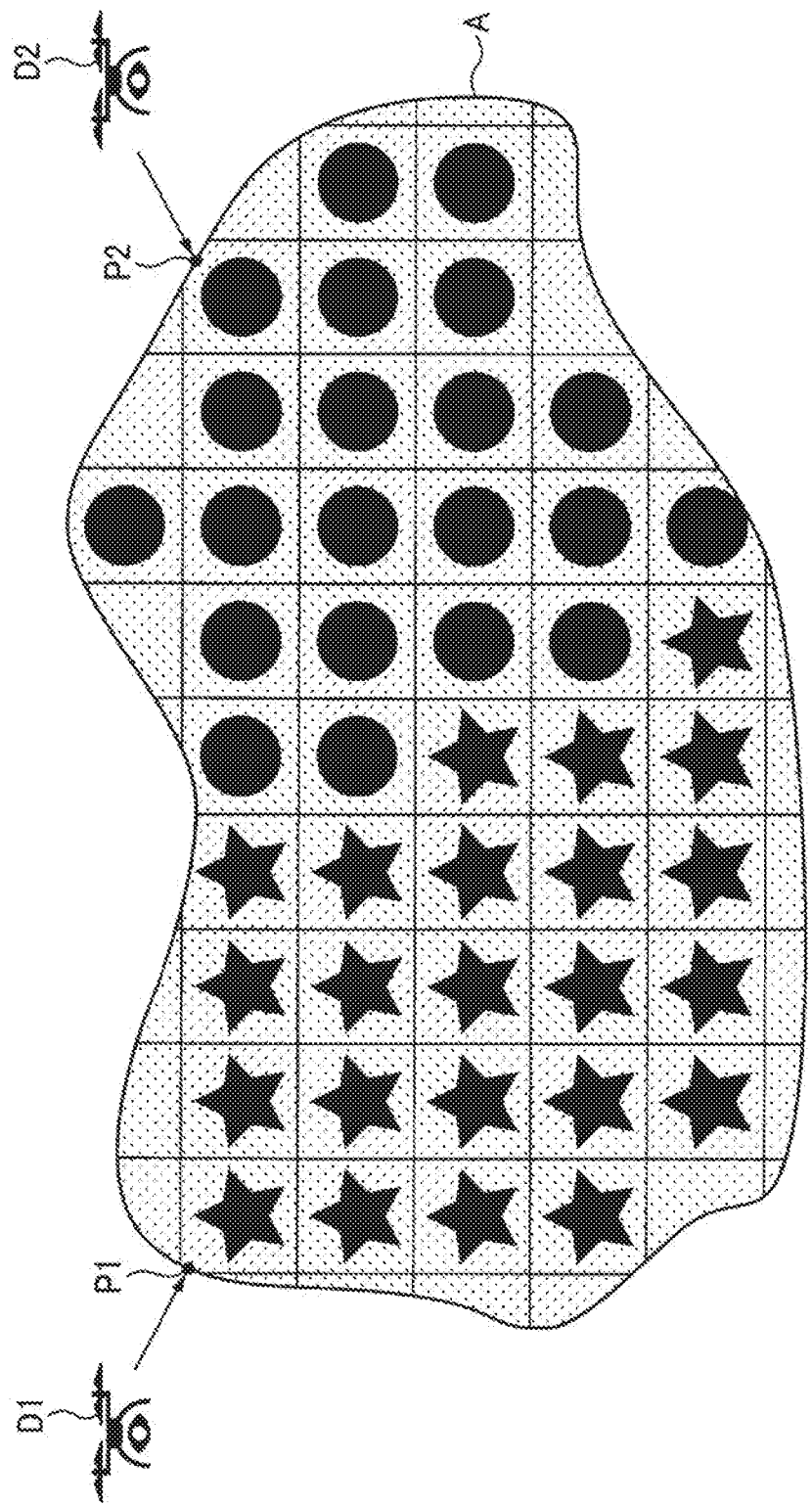
FIG. 10F is a diagram illustrating an example of dividing the predetermined region into sub-regions.
Figure 10G:
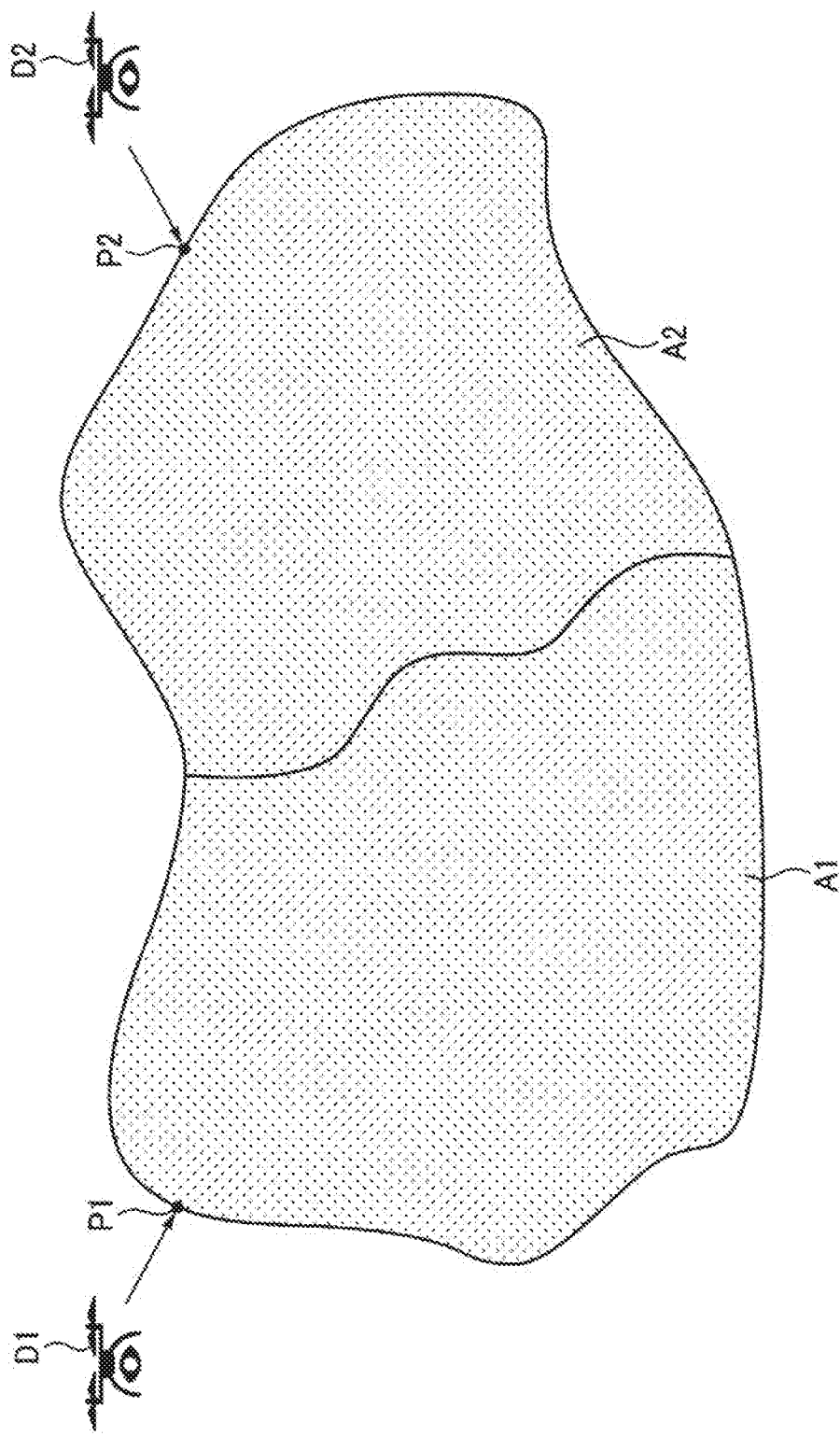
FIG. 10G is a diagram illustrating an example of dividing the predetermined region into sub-regions.

In this way, the information processing device 80 repeatedly carries out the above steps to sequentially mark blocks that are not marked. The result is as shown in FIG. 10F, i.e., all blocks can be allocated to either the unmanned aerial vehicle D1 or the unmanned aerial vehicle D2. Further, based on the allocated two types of blocks, as shown in FIG. 10G, the region A is divided into a sub-region A1 for the work of the unmanned aerial vehicle D1 and a sub-region A2 for the work of the unmanned aerial vehicle D2.

Figure 11:
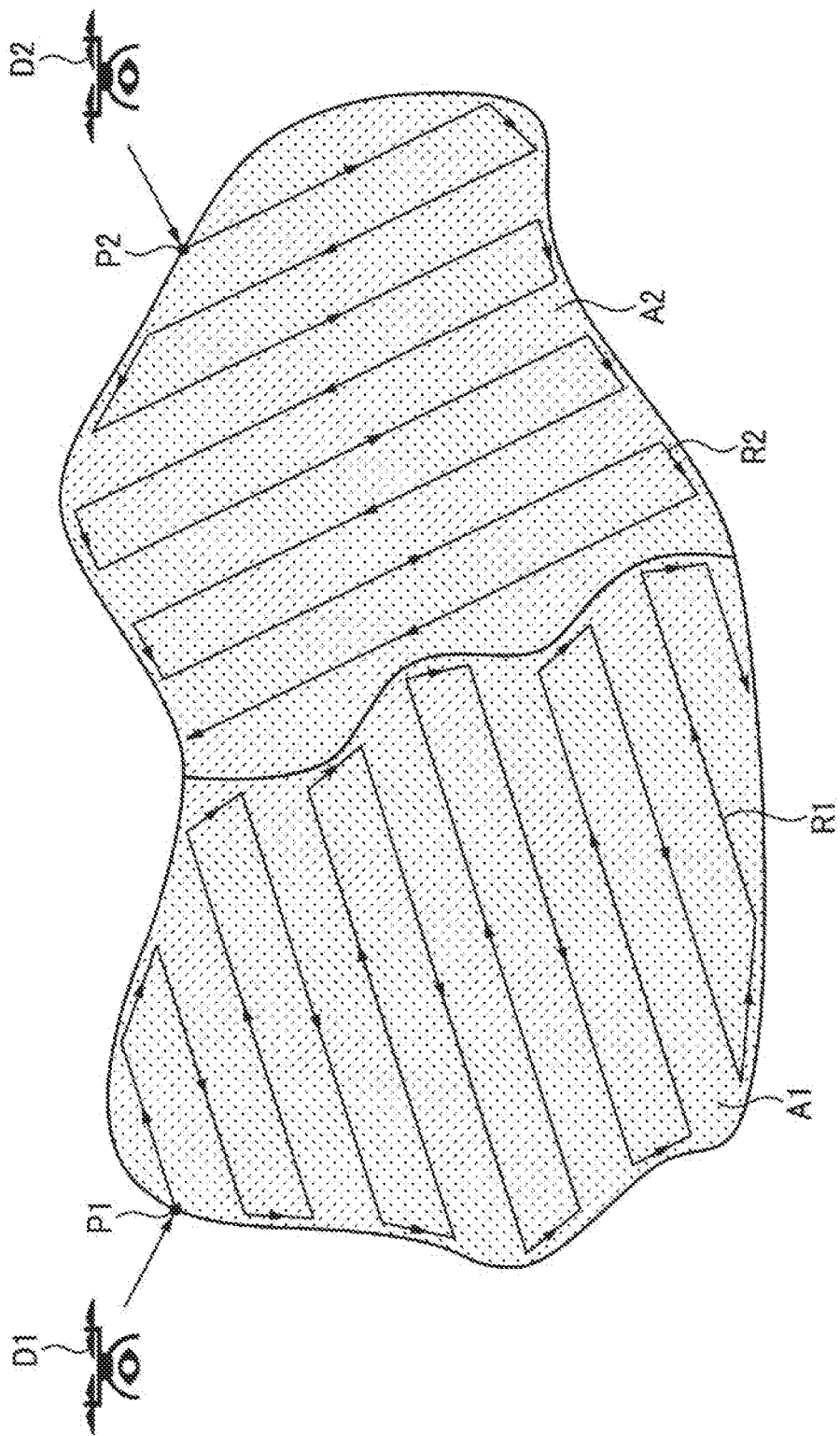
FIG. 11 is a diagram illustrating an example of a flight path determined for each divided sub-region.

After the work region is divided, as shown in FIG. 11, the information processing device 80 respectively determines a flight path R1 for the work of the unmanned aerial vehicle D1 in the sub-region A1 and a flight path R2 for the work of the unmanned aerial vehicle D2 in the sub-region A2. In some embodiments, the flight path starts from the respective work starting positions P1 and P2. Any conventional techniques may be used to determine the path in the sub-regions, and the specific description thereof is omitted here.

Since the unmanned aerial vehicle D1 and the unmanned aerial vehicle D2 sequentially mark blocks having the highest moving load as blocks belonging to the other unmanned aerial vehicle, in this way, the region A is divided into a sub-region A1 and a sub-region A2 such that it is possible to minimize the load by taking the work starting positions P1 and P2 into consideration and working efficiency is improved.

In the above description, the case where work is carried out by the two unmanned aerial vehicles D1 and D2 has been described, but it is obvious that the present embodiment can be applied to the case where work is carried out by three or more unmanned aerial vehicles.

For example, in the case where work is carried out by three unmanned aerial vehicles D1, D2 and D3, a block, the sum of the load thereof for movement with respect to a region including a set of blocks already marked as a region of the unmanned aerial vehicle D2 and the load thereof for movement with respect to a region including a set of blocks already marked as a region of the unmanned aerial vehicle D3 being the highest (for example, the farthest distance), which block is from the unmarked blocks adjacent to the blocks selected as the region of unmanned aerial vehicle D1, is marked as the region of the unmanned aerial vehicle D1.

Next, the block, the sum of the load thereof for movement with respect to the region including the set of the blocks already marked as a region of the unmanned aerial vehicle D1 and the load thereof for movement with respect to the region including the set of the blocks already marked as a region of the unmanned aerial vehicle D3 being the highest (for example, the farthest distance), which block is from the unmarked blocks which are adjacent to the blocks selected as the region of unmanned aerial vehicle D2, is marked as the region of the unmanned aerial vehicle D2.

Next, the block, the sum of the load thereof for movement with respect to the region including the set of the blocks already marked as a region of the unmanned aerial vehicle D1 and the load thereof for movement with respect to the region including the set of the blocks already marked as a region of the unmanned aerial vehicle D2 being the highest (for example, the farthest distance), which block is from the unmarked blocks which are adjacent to the blocks selected as the region of unmanned aerial vehicle D3, is marked as the region of the unmanned aerial vehicle D3.

By repeatedly carrying out the above steps, the information processing device 80 can allocate all the blocks to any one of the unmanned aerial vehicles D1, D2, and D3. Therefore, the region A can be divided into three sub-regions. Further, by the same processing, the present embodiment can be applied to the case where the work is carried out by more unmanned aerial vehicles.

If all the blocks adjacent to the blocks which are already selected as the region of a certain unmanned aerial vehicle are marked, the allocation of the blocks to the unmanned air vehicles may be cancelled at that time. Since the other processes are the same as those in the case of two unmanned aerial vehicles, D1 and D2, duplicate explanation will be omitted.

Embodiment 2

In Embodiment 1, the case where work is carried out by two unmanned aerial vehicles having different starting positions is described. However, in the case where there are multiple aerial vehicles, the starting positions, where multiple unmanned aerial vehicles are on standby or the like at the same base, thereof are concentrated by a predetermined degree or higher, as described in Embodiment 1, when a position is a work starting position where a straight line connecting the starting position with the center of gravity G of a predetermined region A intersects with the outer periphery of the region A, or the position, closest to the starting position, in the region A is the work starting position, the work starting positions of the multiple unmanned aerial vehicles approach each other, which is not preferable in terms of work efficiency. Therefore, in Embodiment 2, a modification in the case where there are multiple aerial vehicles, the starting positions thereof are concentrated by a predetermined degree or higher, is described.

Figure 12:
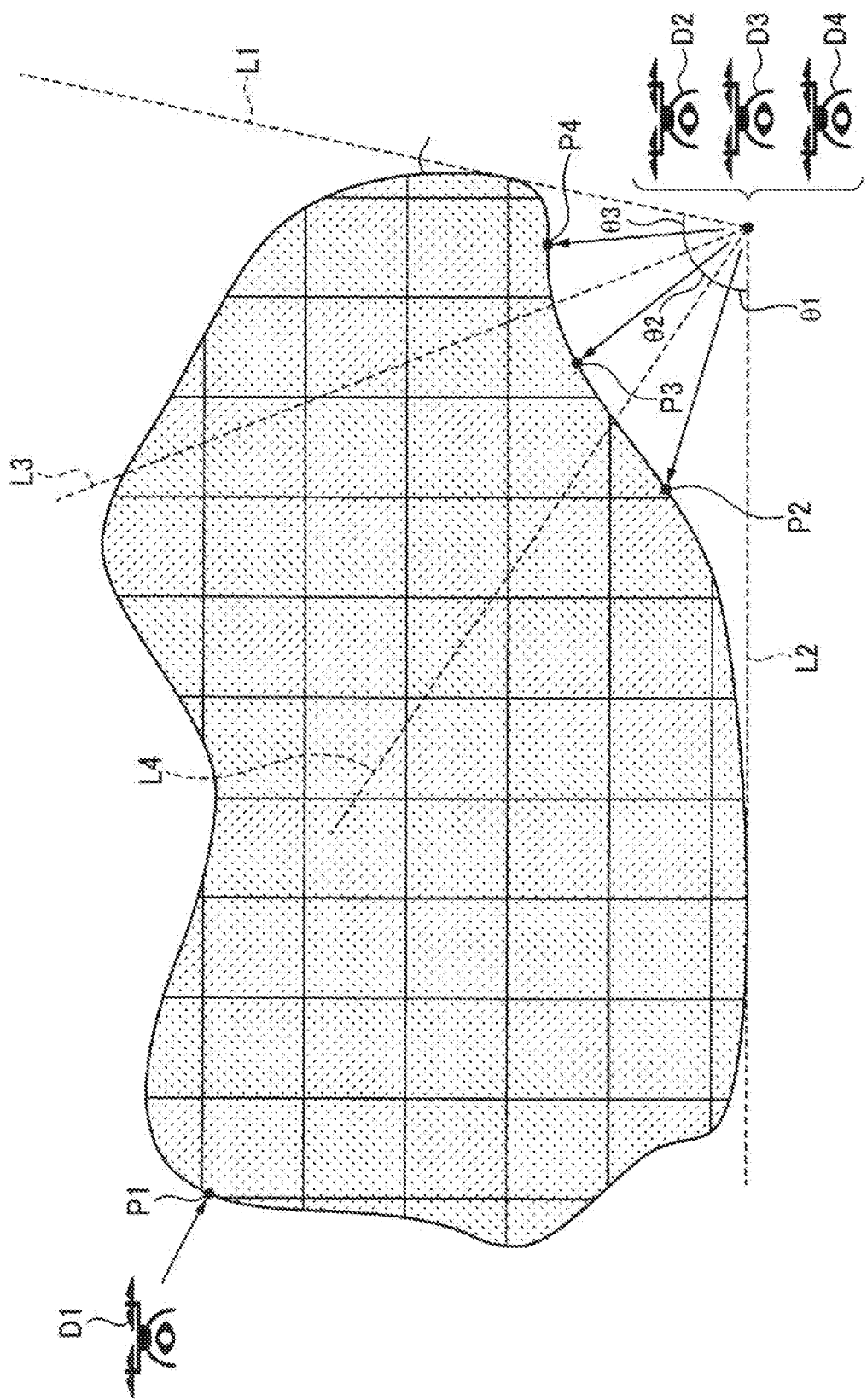
FIG. 12 is a diagram illustrating an example of determining a work starting position in the predetermined region.

In Embodiment 2, as shown in FIG. 12, a starting position of an unmanned aerial vehicle D1 is located at the upper left of the region A, and three unmanned aerial vehicles, D2, D3, and D4, are all on standby at a base in the lower right of the region A.

First, an information processing device 80 determines whether there are multiple aerial vehicles, the starting positions thereof being concentrated by a predetermined degree or higher, e.g., whether the multiple aerial vehicles are at the same starting position. To do this, the area of the region A can be considered. For example, in the case where the area of the region A is 40,000 square meters, if the three unmanned aerial vehicles D2, D3, and D4 are included in a range of 100 square meters, it is determined that these aerial vehicles are in the same base and hence have the same starting position.

When there are multiple aerial vehicles, the starting positions thereof being concentrated by a predetermined degree or higher, the information processing device 80 determines the positions where multiple straight lines, which are radially dispersed with respect to the region A from the starting position, intersect with the outer periphery of the region A to be the work starting positions of respective aerial vehicles. In FIG. 12, two straight lines trisecting the angle formed by tangents L1 and L2 from the base to the region A are L3 and L4. At this time, the position where a straight line bisecting an angle $\theta 1$ formed by L2 and L4 intersects with the outer periphery of the region A may be the work starting position P2 of the unmanned aerial vehicle D2, the position where a straight line bisecting an angle $\theta 2$ formed by L4 and L3 intersects with the outer periphery of the region A may be the work starting position P3 of the unmanned aerial vehicle D3, and the position where a straight line bisecting an angle $\theta 3$ formed by L3 and L1 intersects with the outer periphery of the region A may be the work starting position P4 of the unmanned aerial vehicle D4.

Incidentally, as in Embodiment 1, since there are no other unmanned aerial vehicles in the vicinity of the unmanned aerial vehicle D1, the position P1 where a straight line connecting a starting position P1 with the center of gravity G of the predetermined region A intersects the outer periphery of the region A is the work starting position. Alternatively, the position, closest to the starting position, in the region A may be the work starting position.

Figure 13:
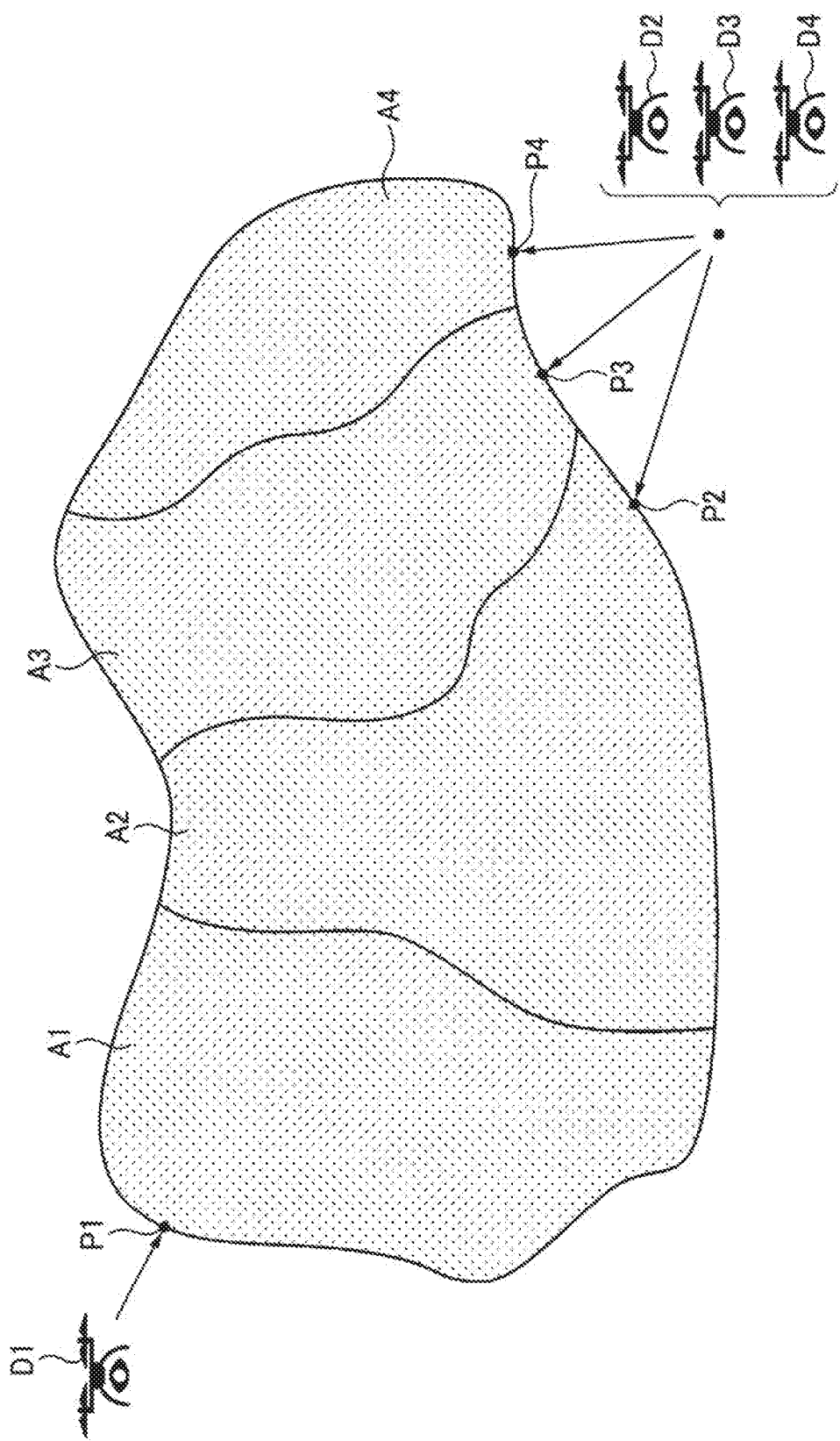
FIG. 13 is a diagram illustrating an example of dividing the predetermined region into sub-regions.

After the work starting positions P1, P2, P3, and P4 of the respective unmanned aerial vehicles D1, D2, D3, and D4 are determined, the information processing device 80 can divide the region A into four sub-regions A1, A2, A3, and A4 where as shown in FIG. 13, the unmanned aerial vehicles D1, D2, D3, and D4 work in the region A by means of the same steps as in Embodiment 1.

Figure 14:
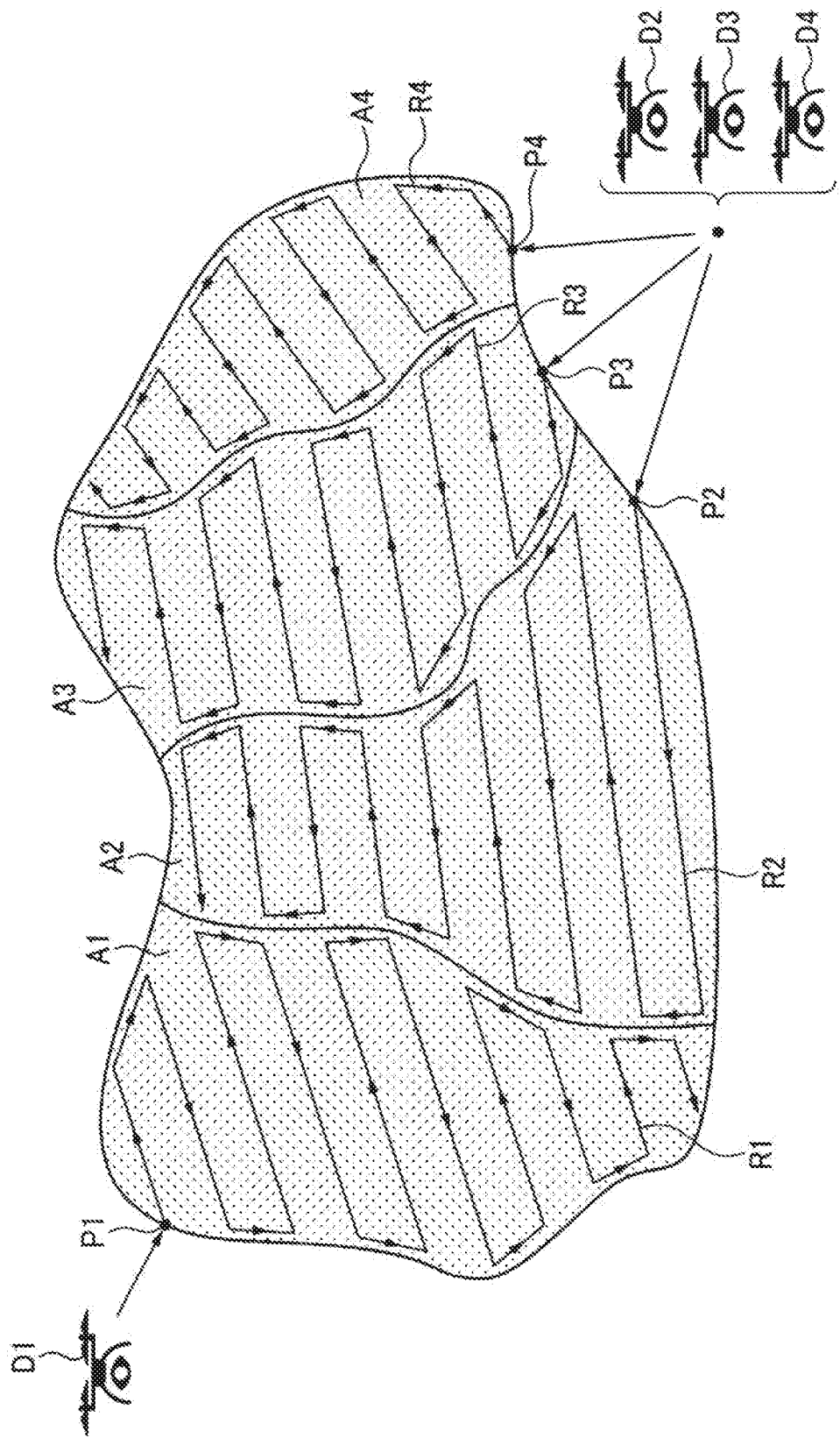
FIG. 14 is a diagram illustrating an example of a flight path determined for each divided sub-region.

After dividing same into the four sub-regions, i.e., A1, A2, A3, and A4, the information processing device 80, as shown in FIG. 14, respectively determines a flight path R1 for the unmanned aerial vehicle D1 to work in the sub-region A1, a flight path R2 for the unmanned aerial vehicle D2 to work in the sub-region A2, a flight path R3 for the unmanned aerial vehicle D3 to work in the sub-region A3, and the flight path R4 for the unmanned aerial vehicle D4 to work in the sub-region A4. In some embodiments, the flight path starts from the respective work starting positions P1, P2, P3, and P4. Any conventional techniques may be used to determine the path in the sub-regions, and the specific description thereof is omitted here.

Accordingly, even if there are multiple aerial vehicles, the starting positions, where multiple unmanned aerial vehicles are on standby or the like at the same base, thereof being concentrated by a predetermined degree or higher, the start positions of these aerial vehicles are prevented from overlapping or approaching each other, and more efficient work can be expected.

Embodiment 3

In the above two embodiments, the case where all of the multiple unmanned aerial vehicles have the same performance has been described. However, it is also conceivable that multiple unmanned aerial vehicles having different performances are used to work. Therefore, in Embodiment 3, a region A is divided into a plurality of sub-regions respectively having an area ratio corresponding to the work efficiency of each aerial vehicle.

Specific steps of the division in Embodiment 3 will be described below by using FIGS. 15A to 15G. Incidentally, the same portions repeated from Embodiment 1 will be appropriately omitted.

This embodiment differs from Embodiment 1 in that an unmanned aerial vehicle D has double the work efficiency of the unmanned aerial vehicle D2. For example, the unmanned aerial vehicle D1 moves at 30 Km/hour, and the unmanned aerial vehicle D2 moves at 60 Km/hour. The work efficiency is not limited to the movement speed, and may be an index that reflects any efficiency, such as a dispersion amount in a unit of time.

Figure 15A:
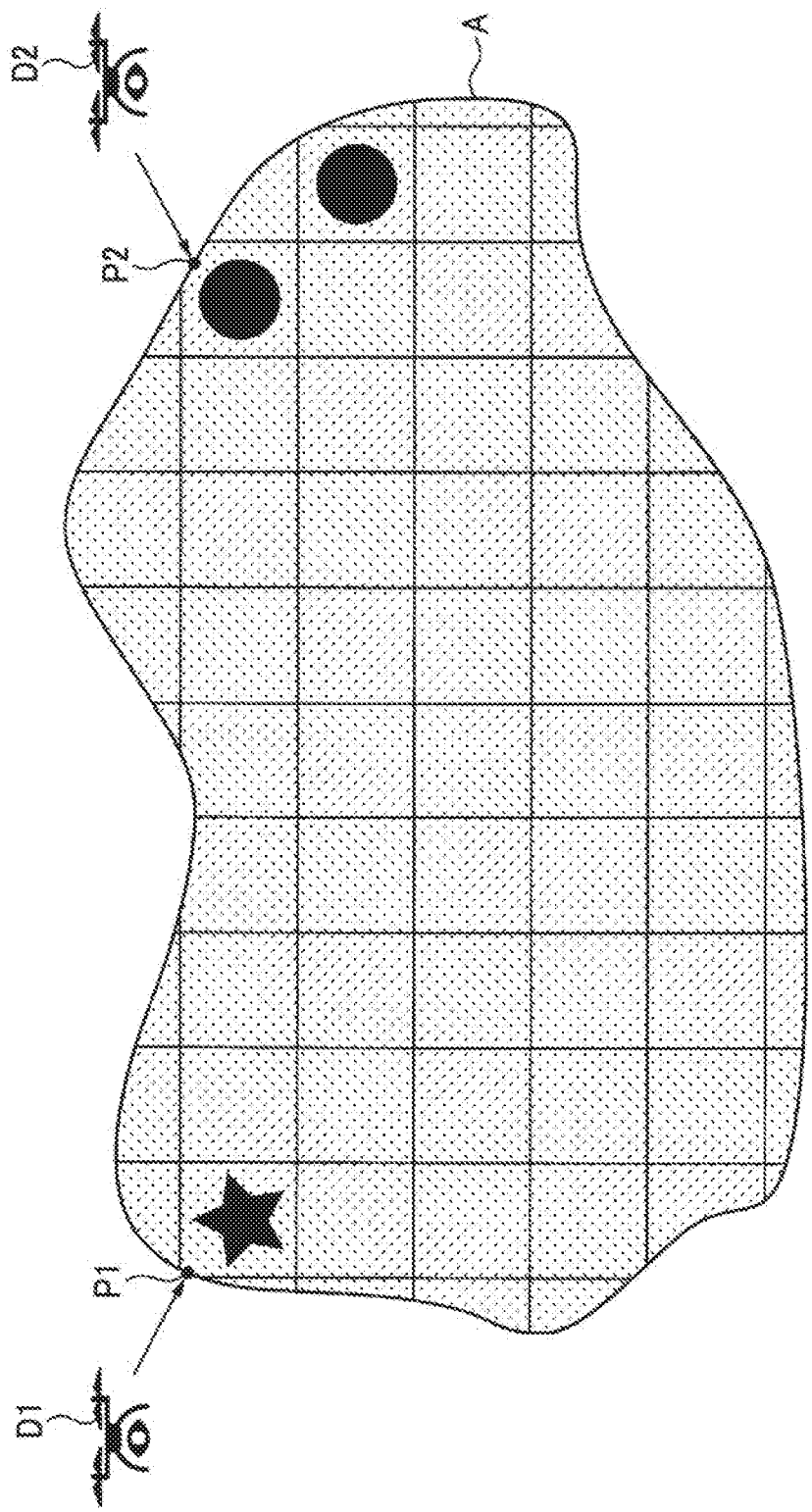
FIG. 15A is a diagram illustrating an example of dividing the predetermined region into sub-regions.

First, the information processing device 80 determines the work starting position by the same method as in Embodiment 1. Thereafter, as shown in FIG. 15A, the region A is unitized into blocks having a predetermined size. The block to which the work starting position P1 belongs is marked as the region of the unmanned aerial vehicle D1 (see "★"), and the block which has the highest load (for example, with the farthest distance) for movement with respect to the block (see "★") selected as the region of the unmanned aerial vehicle D1 and which is from among the block to which the work starting position P2 belongs and the block adjacent to the block belonging to the work starting position P2, these acting as a region of the unmanned aerial vehicle D2, is marked as the region of the unmanned aerial vehicle D2 (see "●").

Figure 15B:
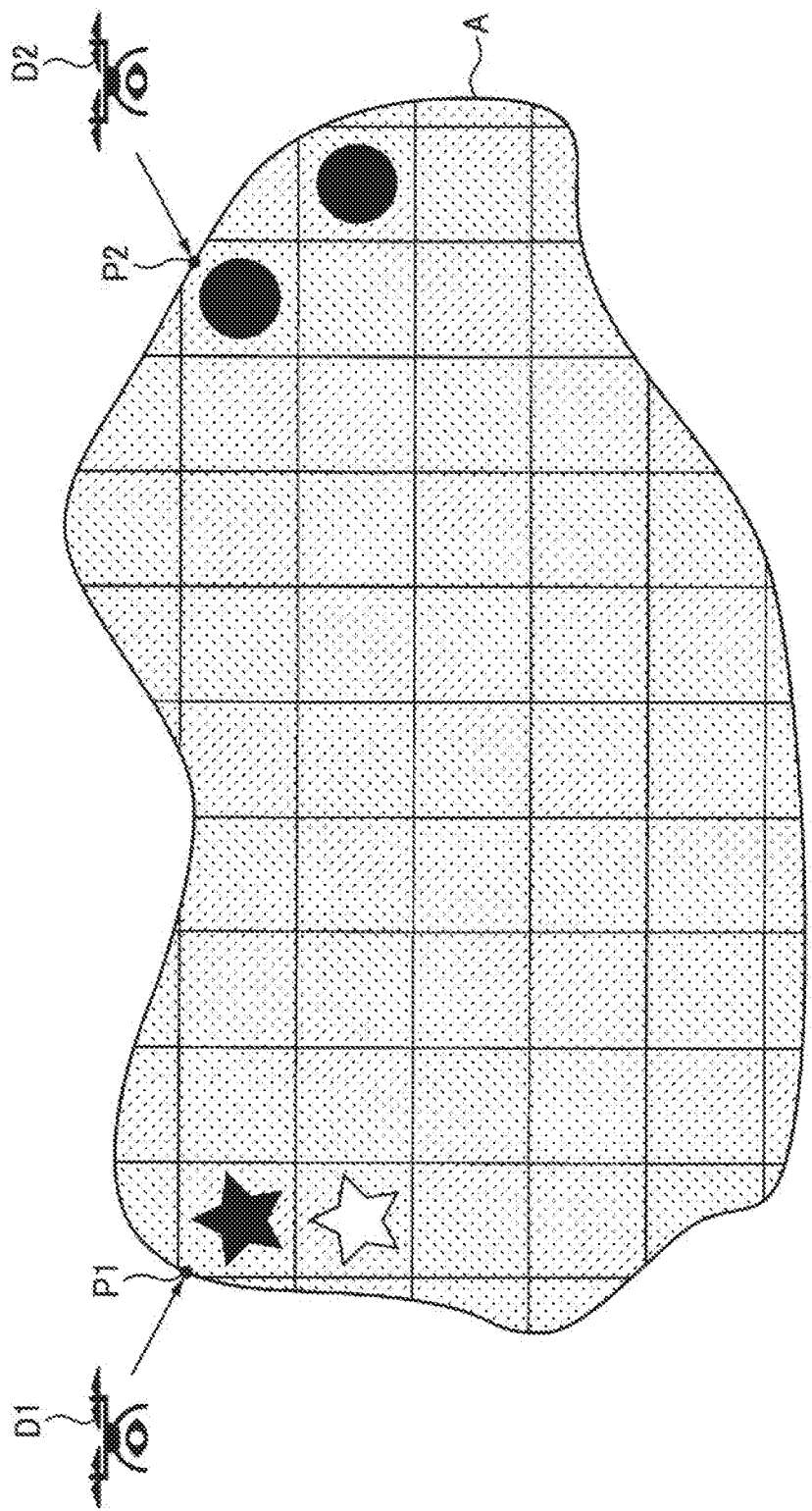
FIG. 15B is a diagram illustrating an example of dividing the predetermined region into sub-regions.

Next, as shown in FIG. 15B, the information processing device 80 marks the block which has the highest load (for example, with the farthest distance) for movement with respect to the block (see "●") marked as the region of the unmanned aerial vehicle D2 and which is from the unmarked block adjacent to the block (see "★") selected as the region of the unmanned aerial vehicle D1 as the region of the unmanned aerial vehicle D1 (see "☆").

Figure 15C:
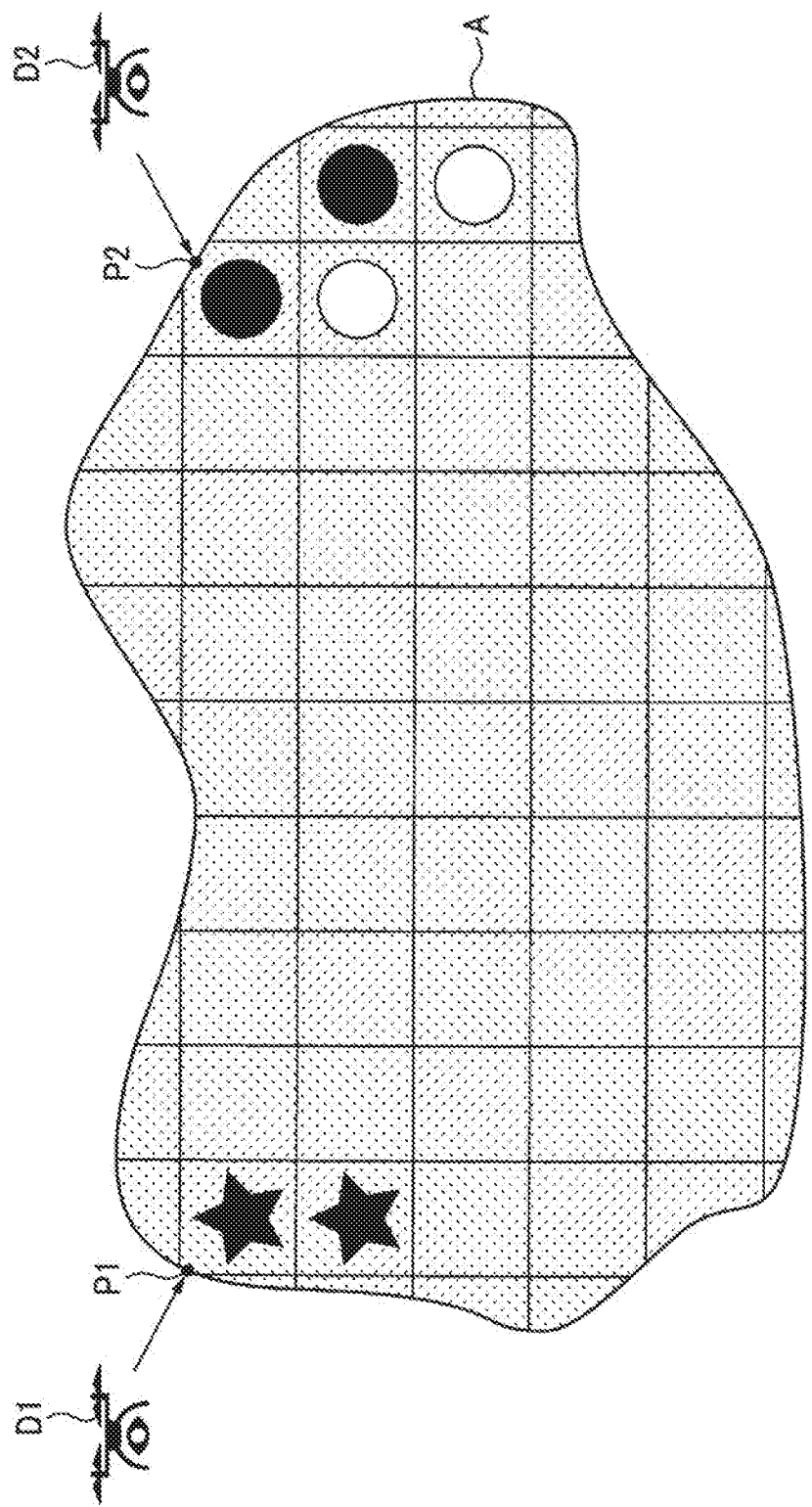
FIG. 15C is a diagram illustrating an example of dividing the predetermined region into sub-regions.

Next, as shown in FIG. 15C, the information processing device 80 marks two blocks which have the highest load (for example, with the farthest distance) for movement with respect to the region including the set of blocks (see "★") marked as the region of the unmanned aerial vehicle D1 and which are from the unmarked block which is adjacent to the block (see "●") selected as the region of the unmanned aerial vehicle D2 as the region of the unmanned aerial vehicle D2 (see "○").

Figure 15D:
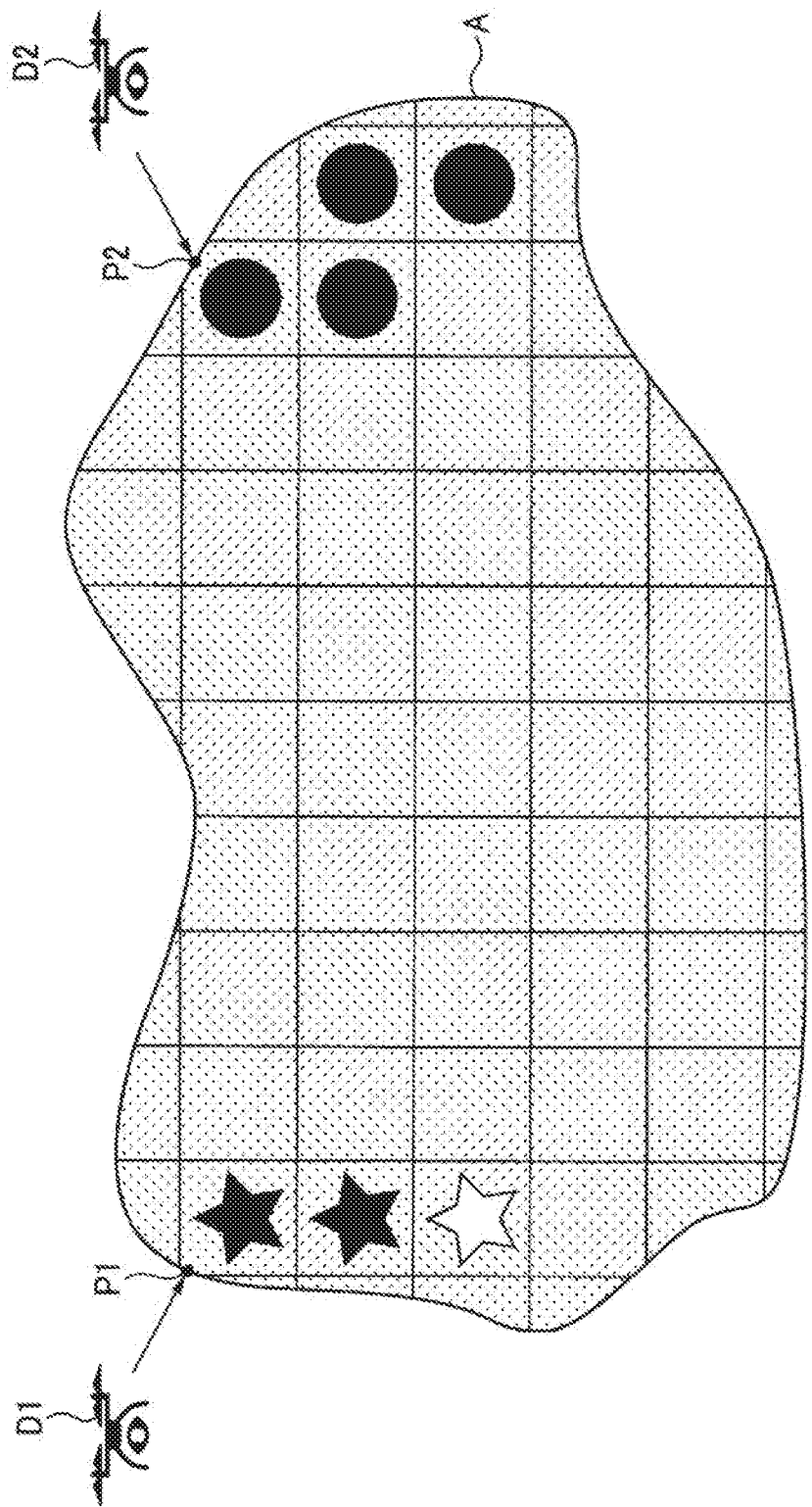
FIG. 15D is a diagram illustrating an example of dividing the predetermined region into sub-regions.

Next, as shown in FIG. 15D, the information processing device 80 marks the block which has the highest load (for example, with the farthest distance) for movement with respect to the region including the set of blocks (see "●") marked as the region of the unmanned aerial vehicle D2 and which are from the unmarked block which is adjacent to the region including the block (see "★") selected as the region of the unmanned aerial vehicle D1 as the region of the unmanned aerial vehicle D1 (see "☆").

Figure 15E:
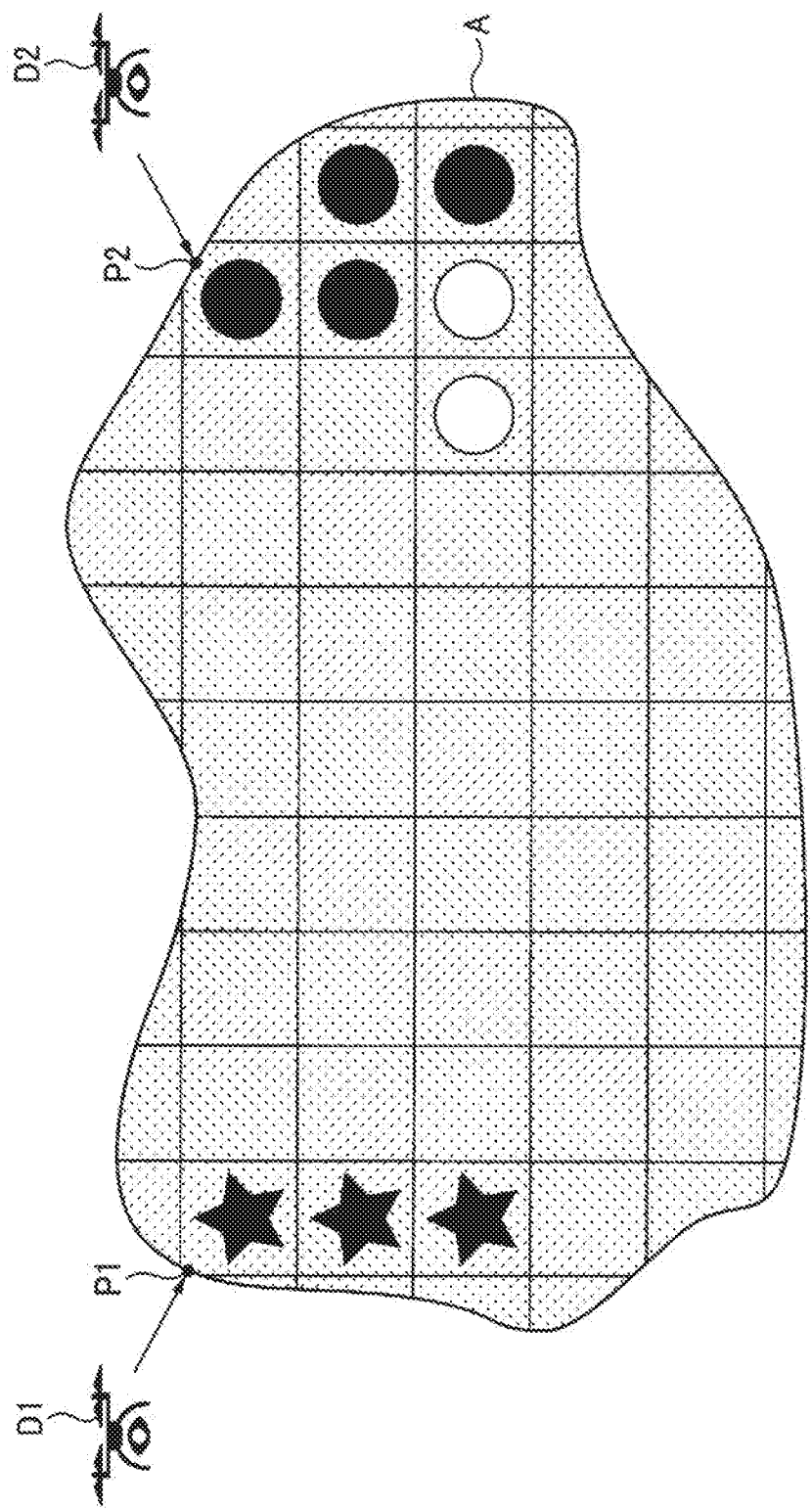
FIG. 15E is a diagram illustrating an example of dividing the predetermined region into sub-regions.

Next, as shown in FIG. 15E, the information processing device 80 marks two blocks which have the highest load (for example, with the farthest distance) for movement with respect to the region including the set of blocks (see "★") marked as the region of the unmanned aerial vehicle D1 and which are from the unmarked block which is adjacent to the region including the block (see "●") selected as the region of the unmanned aerial vehicle D2 as the region of the unmanned aerial vehicle D2 (see "○").

Figure 15F:
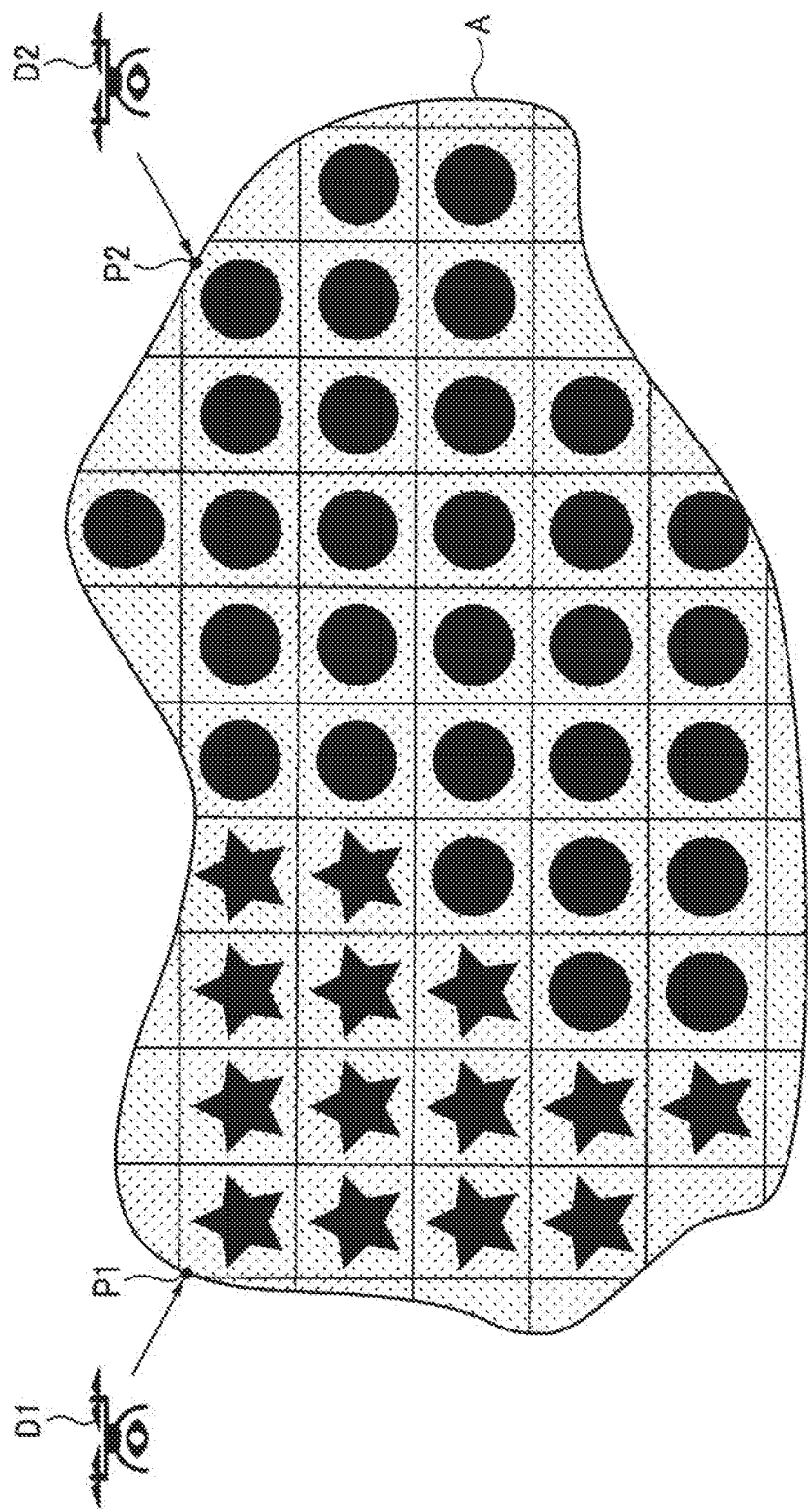
FIG. 15F is a diagram illustrating an example of dividing the predetermined region into sub-regions.

In this way, when the information processing device 80 repeatedly carries out the above steps to sequentially mark blocks that are not marked, as shown in FIG. 15F, all blocks can be allocated to either the unmanned aerial vehicle D1 or the unmanned aerial vehicle D2. At this time, since each time one block is marked as a region of the unmanned aerial vehicle D1, two blocks are marked as a region of the unmanned aerial vehicle D2, the number of blocks allocated to the unmanned aerial vehicle D2 is twice the number of blocks allocated to the unmanned aerial vehicle D1.

Figure 15G:
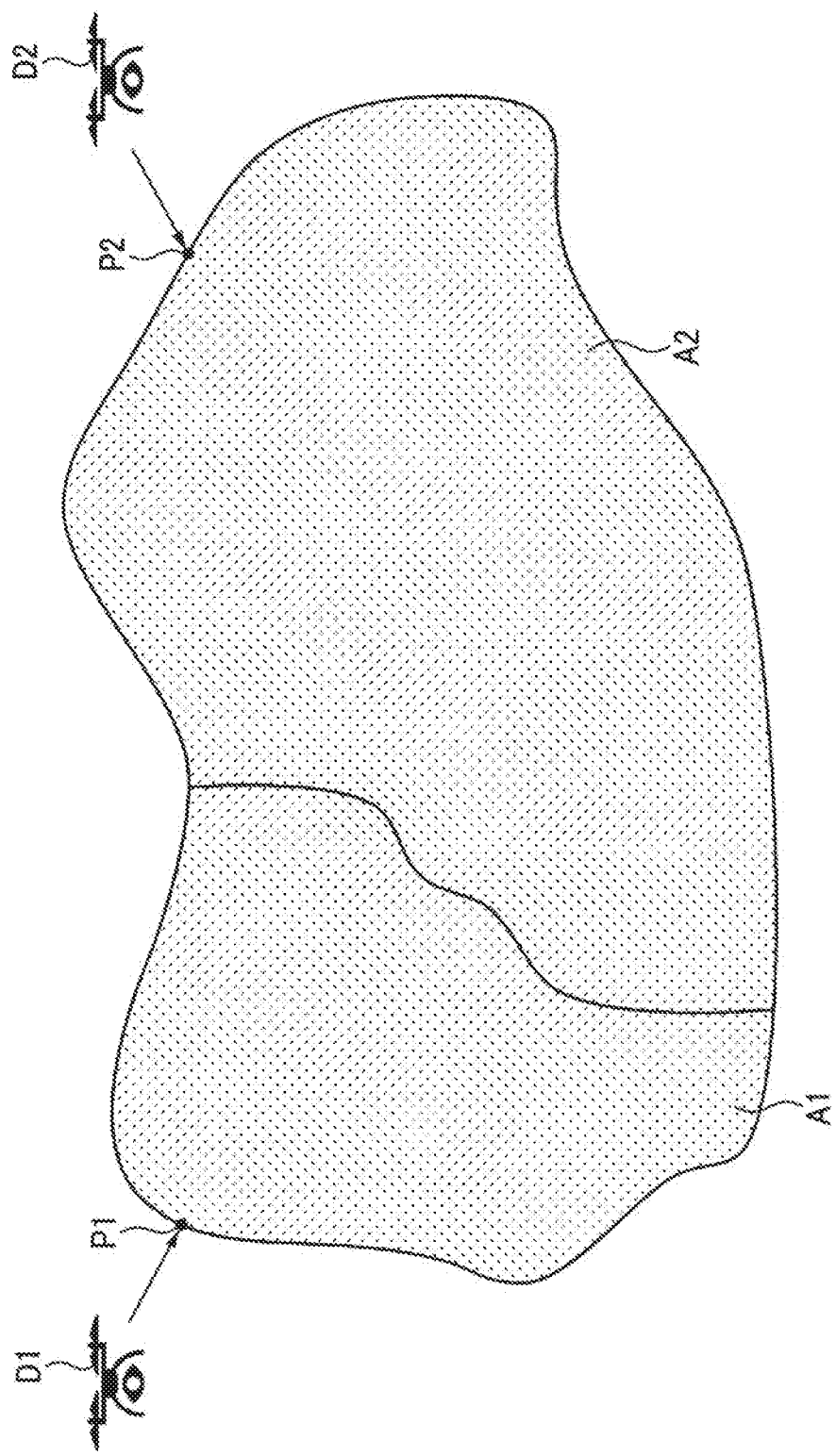
FIG. 15G is a diagram illustrating an example of dividing the predetermined region into sub-regions.

Further, based on the allocated two types of blocks, as shown in FIG. 15G, the information processing device 80 can divide the region A into a sub-region A1 for the work for the unmanned aerial vehicle D1 and a sub-region A2 for the work of the unmanned aerial vehicle D2. At this time, the area of the sub-region A2 is twice the area of the sub-region A1.

Figure 16:
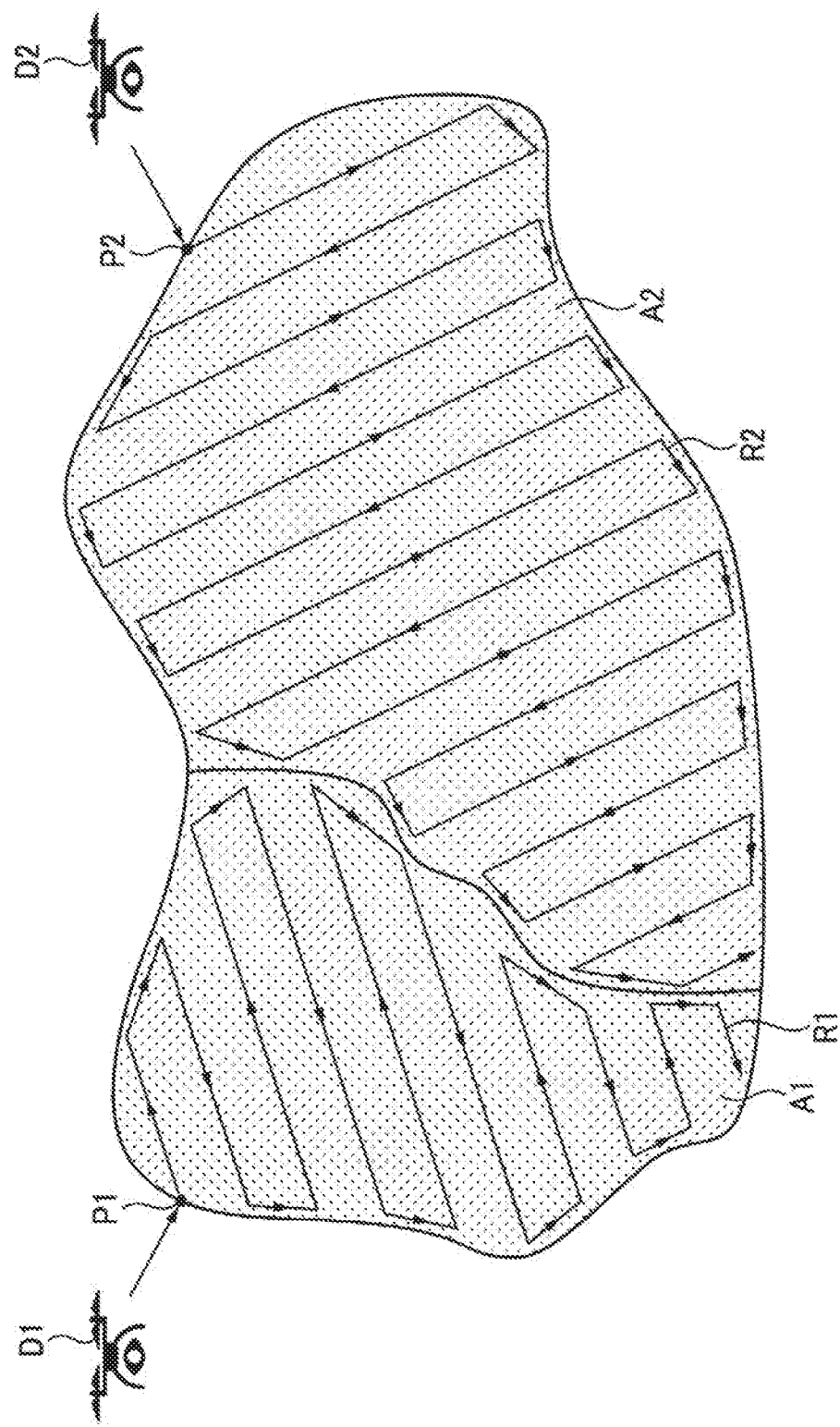
FIG. 16 is a diagram illustrating an example of a flight path determined for each divided sub-region.

After the work region is divided, as shown in FIG. 16, the information processing device 80 respectively determines a flight path R1 for the work of the unmanned aerial vehicle D1 in the sub-region A1 and a flight path R2 for the work of the unmanned aerial vehicle D2 in the sub-region A2. In some embodiments, the flight path starts from the respective work starting positions P1 and P2. Any conventional techniques may be used to determine the path in the sub-regions, and the specific description thereof is omitted here.

In this way, with regard to the unmanned aerial vehicle D1 and the unmanned aerial vehicle D2, sub-regions having areas corresponding to the ratio of work efficiency are allocated, much work can be carried out on the unmanned aerial vehicle having a high work efficiency, and resources can be optimized.

Although specific embodiments of the flight path determination method according to the present disclosure have been described above, the present disclosure is not limited to these configurations.

In each of the above embodiments, the processing executed by the information processing device may be executed by another information processing device such as a smartphone, a tablet, or the like, and may be executed by the unmanned aerial vehicle 100 itself.

The processes (steps) in the flight path determination method may be executed by the processing unit 81 of the information processing device 80.

Since the processes (steps) in the flight path determination method include a program and are executed by the information processing device 80, same may be implemented.

The program in which the processes (step) in the flight path determination method are formed may be stored in a memory 82 or a storage 83 of the information processing device 80.

According to the flight path determination method, the information processing device, the program, and the storage medium according to the present disclosure, since a work region is rationally divided based on the individual attributes of multiple aerial vehicles, not only is the burden on a user reduced, but also, the work efficiency can be improved.

Further, according to the flight path determination method, the information processing device, the program, and the storage medium according to the present disclosure, the flight path suitable for the aerial vehicle that works can be determined for each divided work region, and the flight path can be flexibly set.

Although the embodiments of the flight path determination method, the information processing device, the program, and the storage medium according to the present disclosure have been used and described above, the technical scope of the disclosure is not limited to the scope described in the above embodiments. It is apparent to a person skilled in the art that various alterations or improvements are added to the above-described embodiments. It is also apparent from the description of the claims that embodiments with such alterations or improvements can be included in the technical scope of the present disclosure.

The order of execution of each process such as the operations, procedures, steps, and stages in the flight path determination method, the information processing device, the program, and the storage medium shown in the claims, specification, and drawings is not especially specified with "earlier than", "prior to", and the like, and can be implemented in any order unless the output of the previous processing is used in later processing. For convenience, even if an operation flow in the claims, specification, and drawings is described using "first," "next," or the like, it does not mean that it is necessary to execute same in this order.

DESCRIPTION OF THE REFERENCE NUMERALS

80 Information processing device
81 Processing unit
84 Display unit
100 Unmanned aerial vehicle
110 UAV control unit
130 Gimbal
140 Rotary wing mechanism
150 Imaging device

What is claimed is:

1. A flight path determination method comprising:
displaying a map on a touch panel display of a terminal device;
receiving an input of a user though the touch panel display, the input including a drag operation or a tap operation on the displayed map;
obtaining, based on the input received though the touch panel display, first information of a predetermined region;
obtaining second information of multiple aerial vehicles;
dividing, based on the second information, the predetermined region into a plurality of sub-regions where the multiple aerial vehicles respectively work, including:
dividing the predetermined region into the plurality of sub-regions each having an area ratio corresponding to a work efficiency of a corresponding one of the multiple aerial vehicles;
determining a flight path for each of the plurality of sub-regions; and
controlling flight of the multiple aerial vehicles based on the determined flight path for each of the plurality of sub-regions.

2. The flight path determination method according to claim 1, wherein:
the second information comprises information about an initial position of each of the multiple aerial vehicles, and
dividing the predetermined region into the plurality of sub-regions further comprises:
determining, based on the information about the initial positions of the multiple aerial vehicles, work starting positions of the multiple aerial vehicles; and
dividing, based on the work starting positions of the multiple aerial vehicles, the predetermined region into the plurality of sub-regions.

3. The flight path determination method according to claim 2, wherein determining the work starting positions of one aerial vehicle of the multiple aerial vehicles includes:
determining a position at which a straight line connecting the initial position of the one aerial vehicle and a center of gravity of the predetermined region intersects with an outer periphery of the predetermined region to be the work starting position of the one aerial vehicle.

4. The flight path determination method according to claim 2, wherein determining the work starting positions of one aerial vehicle of the multiple aerial vehicles includes:
determining a position on an outer periphery of the predetermined region that is closest to the initial position of the one aerial vehicle to be the work starting position of the one aerial vehicle.

5. The flight path determination method according to claim 2, wherein:
the multiple aerial vehicles share a same initial position; and
determining the work starting positions of the multiple aerial vehicles includes determining positions at which multiple straight lines, which are radially dispersed to the predetermined region from the initial position, intersect with an outer periphery of the predetermined region to be the work starting positions of the multiple aerial vehicles.

6. The flight path determination method according to claim 1, further comprising:
displaying at least one of the plurality of sub-regions.

7. The flight path determination method according to claim 1, further comprising:
displaying the flight path.

8. The flight path determination method according to claim 1, further comprising:

transmitting information about the flight path to a corresponding one of the multiple aerial vehicles.

9. An information processing device comprising:
a storage medium storing a program;
a touch panel display; and
a processor configured to execute the program to:
   display a map on the touch panel display;
   receive an input of a user though the touch panel display, the input including a drag operation or a tap operation on the displayed map;
   obtain, based on the input received though the touch panel display, first information of a predetermined region;
   obtain second information of multiple aerial vehicles;
   divide, based on the second information, the predetermined region into a plurality of sub-regions where the multiple aerial vehicles respectively work, including:
      dividing the predetermined region into the plurality of sub-regions each having an area ratio corresponding to a work efficiency of a corresponding one of the multiple aerial vehicles;
   determine a flight path for each of the plurality of sub-regions; and
   control flight of the multiple aerial vehicles based on the determined flight path for each of the plurality of sub-regions.

10. The information processing device according to claim 9, wherein:
the second information comprises information about an initial position of each of the multiple aerial vehicles, and
the processor is further configured to execute the program to:
   determine, based on the information about the initial positions of the multiple aerial vehicles, work starting positions of the multiple aerial vehicles; and
   divide, based on the work starting positions of the multiple aerial vehicles, the predetermined region into the plurality of sub-regions.

11. The information processing device according to claim 10, wherein the processor is further configured to execute the program to, for one aerial vehicle of the multiple aerial vehicles:
   determine a position at which a straight line connecting the initial position of the one aerial vehicle and a center of gravity of the predetermined region intersects with an outer periphery of the predetermined region to be the work starting position of the one aerial vehicle.

12. The information processing device according to claim 10, wherein the processor is further configured to execute the program to, for one aerial vehicle of the multiple aerial vehicles:
   determine a position on an outer periphery of the predetermined region that is closest to the initial position of the one aerial vehicle to be the work starting position of the one aerial vehicle.

13. The information processing device according to claim 10, wherein:
the multiple aerial vehicles share a same initial position; and
the processor is further configured to execute the program to:
   determine positions at which multiple straight lines, which are radially dispersed to the predetermined region from the initial position, intersect with an outer periphery of the predetermined region to be the work starting positions of the multiple aerial vehicles.

14. The information processing device according to claim 9, wherein the second information of the multiple aerial vehicles comprises information about a work efficiency of each of the multiple aerial vehicles.

15. The information processing device according to claim 9, wherein the processor is further configured to execute the program to:
   display at least one of the plurality of sub-regions on the touch panel display.

16. The information processing device according to claim 9, wherein the processor is further configured to execute the program to:
   display the flight path on the touch panel display.

17. The information processing device according to claim 9, wherein the processor is further configured to execute the program to:
   transmit information about the flight path to a corresponding one of the multiple aerial vehicles.

18. A non-transitory computer-readable storage medium storing a program causing an information processing device to:
   display a map on a touch panel display of a terminal device;
   receive an input of a user though the touch panel display, the input including a drag operation or a tap operation on the displayed map;
   obtain, based on the input received though the touch panel display, first information of a predetermined region;
   obtain second information of multiple aerial vehicles;
   divide, based on the second information, the predetermined region into a plurality of sub-regions where the multiple aerial vehicles respectively work, including:
      dividing the predetermined region into the plurality of sub-regions each having an area ratio corresponding to a work efficiency of a corresponding one of the multiple aerial vehicles;
   determine a flight path for each of the plurality of sub-regions; and
   control flight of the multiple aerial vehicles based on the determined flight path for each of the plurality of sub-regions.

* * * * *